Aug. 3, 1954

F. KESSLER ET AL 2,685,617

AUTOMATIC TOLL TRUNKING SYSTEM

Original Filed Oct. 16, 1950

INVENTORS.
FRANK KESSLER
WILLIAM W. PHARIS
BY
J. L. Bowes
ATTORNEY

OUTGOING TRUNK REPEATER

OUTGOING TRUNK REPEATER

INVENTORS.
FRANK KESSLER
WILLIAM W. PHARIS
BY
ATTORNEY

INCOMING TRUNK REPEATER

Aug. 3, 1954   F. KESSLER ET AL   2,685,617
AUTOMATIC TOLL TRUNKING SYSTEM
Original Filed Oct. 16, 1950   9 Sheets-Sheet 6

NOTES – 1. CONNECT M WIRE TO ALL XX LEVELS NOT REQUIRING DIGIT CANCELLING.
2. CONNECT W WIRE TO ALL XX LEVELS REQUIRING DIGIT CANCELLING.
3. CONNECT Q WIRE TO ALL X LEVELS AT WHICH INCOMING REPEATER IS TO SWITCH THROUGH.

INVENTORS.
FRANK KESSLER
WILLIAM W. PHARIS
BY
*T. L. Bowes*
ATTORNEY

INVENTORS.
FRANK KESSLER
WILLIAM W. PHARIS
BY
ATTORNEY

Patented Aug. 3, 1954

UNITED STATES PATENT OFFICE 2,685,617

AUTOMATIC TOLL TRUNKING SYSTEM

Frank Kessler, Los Angeles, Calif., and William W. Pharis, Rochester, N. Y., assignors to Stromberg-Carlson Company, a corporation of New York Original application October 16, 1950, Serial No. 190,366. Divided and this application October 18, 1951, Serial No. 251,961

12 Claims. (Cl. 179—27)

This invention relates to telephone exchange systems employing automatic switching and the objects are to provide improved circuit arrangements for handling toll calls from a toll board to subscriber's lines in a dial office. Although the toll board and the automatic switching equipment may be in the same office, the present disclosure contemplates the toll board in one office and inter-connected to a distant dial office by means of one-way trunks, one of which is illustrated in the drawings and described in the description. The present application is a division of the earlier filed application Serial No. 190,366, filed October 16, 1950, and issued February 16, 1954, as United States Patent No. 2,669,606.

The main object of the present invention is the provision of the various enumerated features in a toll switching system in a simple and economical manner.

A feature of the invention relates to a novel incoming trunk repeater, terminating a toll line from a toll board, for connecting the toll line straight through the repeater and cutting the repeat coil of the repeater out of the circuit when certain marked levels of the incoming selector, with which the repeater is operatively associated, are selected.

Another feature of the invention contemplates a two-wire inter-office trunk inter-connecting the toll board and the dial office, with wet-dry supervision repeated to the toll board under the control of a conductor extending through the automatic switching equipment, which conductor is independent of the talking circuit.

Still another feature of the present invention relates to a two-speed flash busy and busy tone arrangement, whereby a busy flash signal at one rate and a busy tone are transmitted to the toll board in response to a call to a busy line, while a busy flash signal at another rate without the busy tone is transmitted to the toll board on a call to overflow, that is, finding all trunks in a group busy.

Another feature closely related to the last mentioned feature is the provision of the flash busy signal by flashing the inter-office trunk with an intermittent wet-dry signal.

An additional feature of the invention comprises applying coin control potential at the toll board to the inter-office trunk, receiving this potential at the incoming trunk circuit in the dial office, repeating the proper coin control potential at the incoming trunk circuit to the called line by way of the connector switch and switching the called line straight through the connector switch to the trunk circuit.

Still an additional feature of this invention is the provision of means whereby the toll operator can release the connection with the inter-office trunk in a dry condition, that is, no current on the trunk, which is the condition when the called party is on the line.

A further feature of the invention relates to a connector, operated as above mentioned, which will also function to automatically collect the coin at the called station at the time the connection is released.

An additional feature of the invention is the provision of a line seizure visual signal at the toll operator's position to indicate that the called line has been seized. This feature in the present invention is controlled over the fourth or control conductor in the dial office equipment and by a single reversal of the line current over the trunk line. A feature closely related to this arrangement is the single reversal of the trunk to indicate line seizure, with other indications transmitted over the trunk by wet-dry conditions.

A still further feature of the invention relates to operator controlled ringing start and re-ring operations of the connector, these controls being recorded at the incoming trunk circuit in the dial office and relayed to the connector in this office by way of a separate control conductor, this control conductor also being used to control supervision, flash busy and coin control operations.

Other features of the invention not specifically mentioned will be apparent from the following description considered in connection with the drawings in which.

Figure 1:
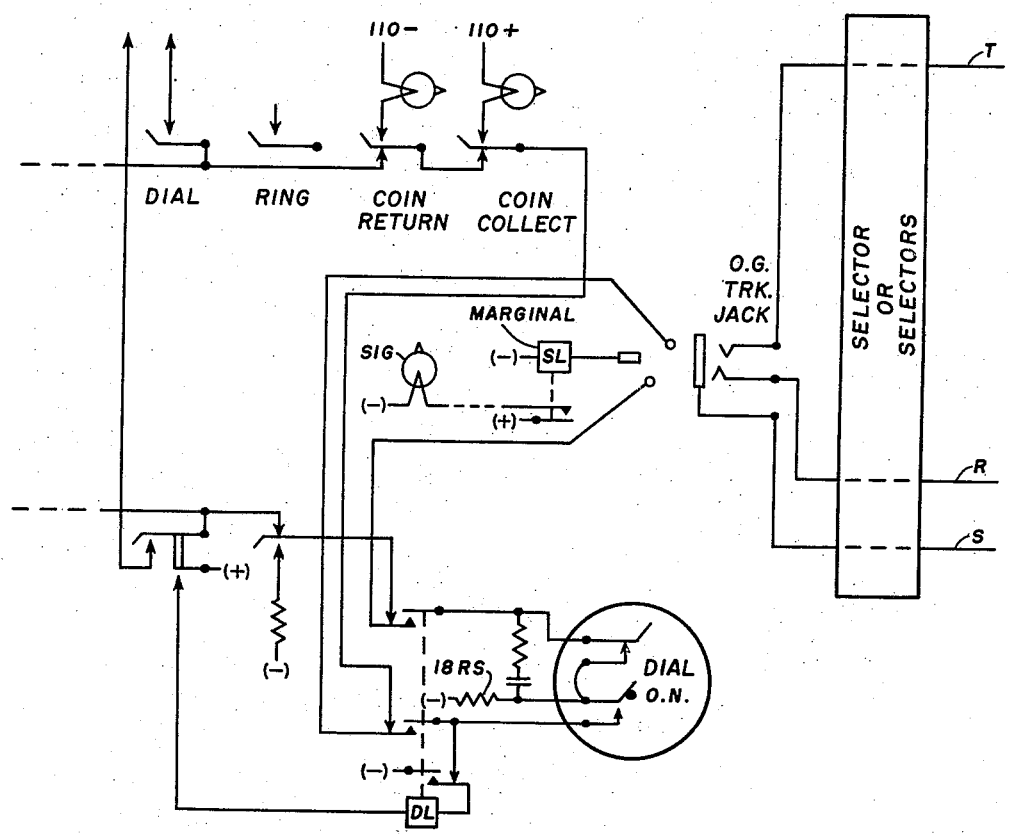
Fig. 1 illustrates the outgoing trunk jack terminating the illustrated trunk circuit at the toll board, together with sufficient portions of the cord and dial circuits to illustrate the various circuit operations.
Figure 2:
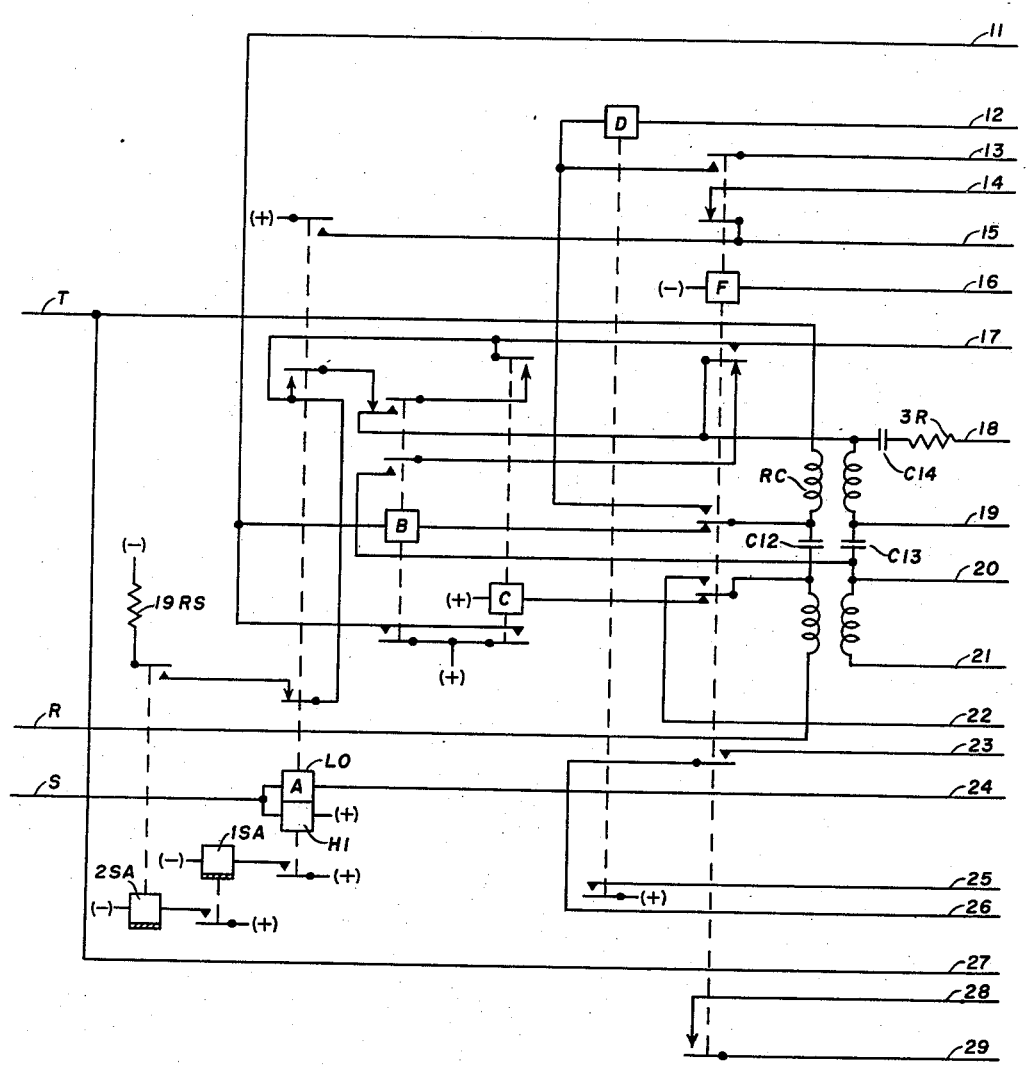
Figs. 2 and 3 illustrate the outgoing trunk circuit repeater associated with the above mentioned outgoing trunk jack, this repeater terminating the illustrated trunk circuit at the toll office.
Figure 3:
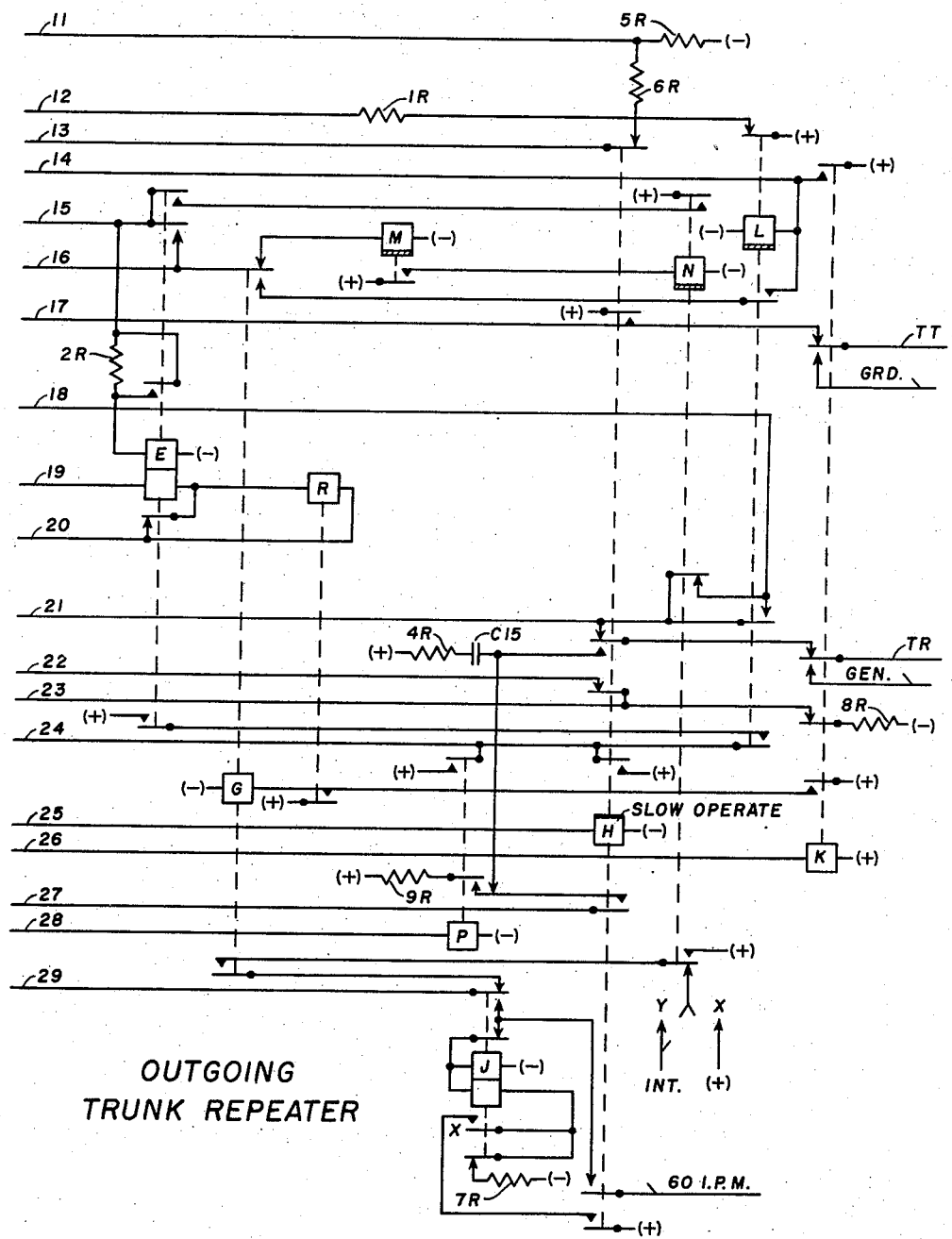

For the purpose of simplifying the illustrations and facilitating the explanation, various parts and circuits constituting the embodiment of the present invention have been shown diagrammatically and certain conventional illustrations have been employed, the drawings having been made more with the purpose in mind of making it easy to understand the operation of the circuits than illustrating the specific construction and arrangement of parts that would be employed in practice. For example, the various relays and their contacts are illustrated in a conventional manner with symbols used to indicate the connections with the terminals of batteries or other sources of current, instead of showing all the wiring connections to these terminals. The relays are given reference characters where possible to indicate the mode of operation in the circuit. For example, relay CB is the calling bridge relay, relay RD is the release delay relay, and relay XD is the delay relay following the X operation of the switch. Plus and minus symbols (+) and (—) are employed to indicate the positive and negative terminals respectively of the usual central office common battery instead of using the ground and battery symbols frequently found in telephone circuits, it being understood that the (+) terminal is connected to ground. The reference characters 118— and 118+ refer to coin return and coin collect potentials respectively, it being understood that these connections are common to the illustrated equipment and are used for coin control purposes. The contacts of the various relays are located at various distances from the block representing the winding of the associated relay and those contacts controlled by a relay are indicated as being associated therewith by means of a dashed line.

With this general description of the objects of the invention and the apparatus involved in mind, a detailed description of the operation under various conditions will now be given. It will be convenient to give several examples of the circuit operation, such as a toll call to an idle line, delayed ring, ring start, re-ring, etc.

Local call through connector

Since the features of the present invention relate to toll connections, it is not believed necessary to describe the detailed operation of the combination connector when used on a local call. It need only be pointed out that the CHS conductor, leading to the connector, is not terminated at local selector banks. Consequently, there is no operation of the TL relay in the connector on a local call, thus preventing the operation of the RT relay on this type of call until the call is answered. To clarify this operation, it will be later pointed out how the TL relay operates and locks the RT relay in the connector to hold off ringing the called line until the operator, on a toll call, rings over the trunk circuit.

Toll call to idle line

When the toll operator, in response to a call for a station reached by means of the illustrated inter-office trunk, plugs into the outgoing trunk jack associated with this trunk, a circuit is closed for relay SL of the cord circuit and relay A of the outgoing trunk circuit which may be traced from (+), lower high resistance winding of relay A, sleeve conductor S, sleeve contacts of jack and plug and winding of relay SL to (—). This circuit is closed in the event that the outgoing trunk jack is directly connected to an outgoing trunk circuit. In some installations there will be one or more selectors interposed between the outgoing trunk jack and the outgoing trunk circuit, in which event the outgoing trunk circuit is not seized until one or more digits are dialed for selecting the outgoing trunk. Where one or more selectors are used, the above-mentioned circuit for relays SL and A are closed when the outgoing trunk circuit repeater is seized, thus operating relay A but, due to its marginal characteristics, relay SL is not operated at this time. When the dial is first turned off normal to transmit the first digit after plugging into the outgoing trunk jack, a circuit is closed for operating dial relay DL which may be traced from (+), make contact of the dial key (operated to permit dialing operations), winding of relay DL, break contact of relay DL, make contact ON of the dial and resistor 18RS to (—). Relay DL locks itself operated over a circuit extending from (+) at the operated dial key, winding and make contact of relay DL to (—). When the dial key is restored at the end of the dialing operation, relay DL releases to disconnect the dial from the cord.

When the outgoing trunk circuit is seized and relay A is operated, an obvious circuit is closed for operating slow acting relay 1SA and this relay in turn closes an obvious circuit for operating relay 2SA. The function of these two slow acting relays will be explained in connection with the condition where the toll operator disconnects while the called party is still on the line. Relay A closes a circuit for operating relay L which may be traced from (+), make contact of relay A, break contact of relay F and winding of relay L to (—). With the plug in the jack, a circuit is closed for operating relay C of the outgoing trunk repeater which may be traced from (+), winding of relay C, break contact of relay F, lower left hand winding of the repeat coil RC, ring conductor R, ring contacts of the jack and plug, make contact of relay DL, impulse contacts of the dial and resistor 18RS to (—). Since it is well known how one or more selectors may be operated over a dialing circuit, such as the one illustrated, the selector operation in the originating office will be ignored in connection with this description. With the dial off normal a circuit is now closed for operating relay B which may be traced from (+), make contact of relay C, winding of relay B, break contact of relay F, upper left hand winding of repeat coil RC, trunk conductor T, contacts of the jack and plug, make contact of relay DL, off normal contacts of the dial and resistor 18RS to (—). Relay B substitutes (+) for the (+) applied at the make contact of relay C for providing a holding circuit for the B relay while relay C repeats the impulses from the dial.

A closed circuit is now provided for the interoffice trunk for operating relay CB of the incoming trunk circuit repeater, this circuit being traced from (+), upper winding of relay CB of the incoming trunk repeater, break contact of relay LS, break contact of relay SR, break contact of relay RG1, resistance R3, break contact of relay CS1, break contact of relay LS, another break contact of relay LS, break contact of relay CT, tip trunk conductor TT, break contact of relay K of the outgoing trunk repeater, make contact of relay C, make contact of relay B, break contact of relay F, make contact of relay B, lower right hand winding of repeat coil RC, break contact of relay H, break contact of relay K, ring trunk line conductor TR, break contact of relay CT, break contact of relay LS, lower left hand winding of repeat coil RC, break contact of relay CS1, resistor R4, break contact of relay RG1, break contact of relay SR and lower winding of relay CB to (—). Relay CB of the incoming trunk repeater closes a circuit for operating relay RD which may be traced from (+), break contact of relay CT, make contact of relay CB, break contact of relay LS, break contact of relay RS and winding of relay RD to (—).

The line circuit to the incoming selector associated with the incoming repeater is now closed for operating relay CB of this selector, this circuit being traced from (+), overflow contact 2OF of the incoming selector, break contact of relay XD, upper winding of relay CB, break contact of relay SW, trunk conductor T, break contact of relay CT, break contact of relay SW, make contact of relay CB, break contact of relay SW, make contact of relay RD, break contact of relay CT, trunk conductor R, break contact of relay SW of the selector and lower winding of relay CB to (—). Relay CB of the selector closes an obvious circuit for operating relay RD and relay RD closes a circuit for operating relay XD which may be traced from (+), off normal contact 1XON, make contact of relay RD and lower winding of relay XD to (—). Relay RD applies (+) to conductor S leading back to the incoming repeater for holding circuits that will be later described.

Figure 4:
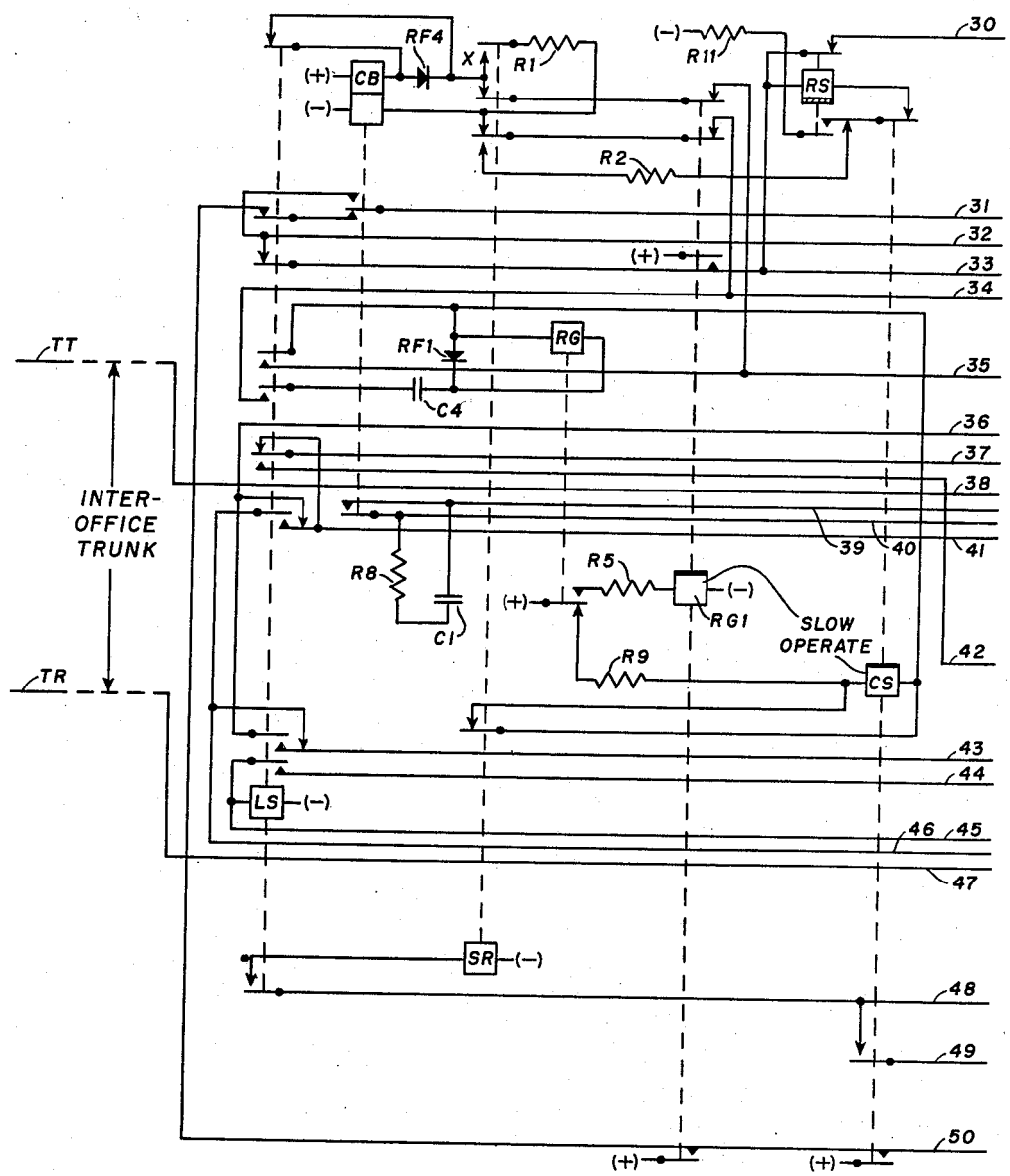
Figs. 4 and 5 illustrate the incoming trunk circuit repeater which terminates the toll trunk at the dial office.
Figure 5:
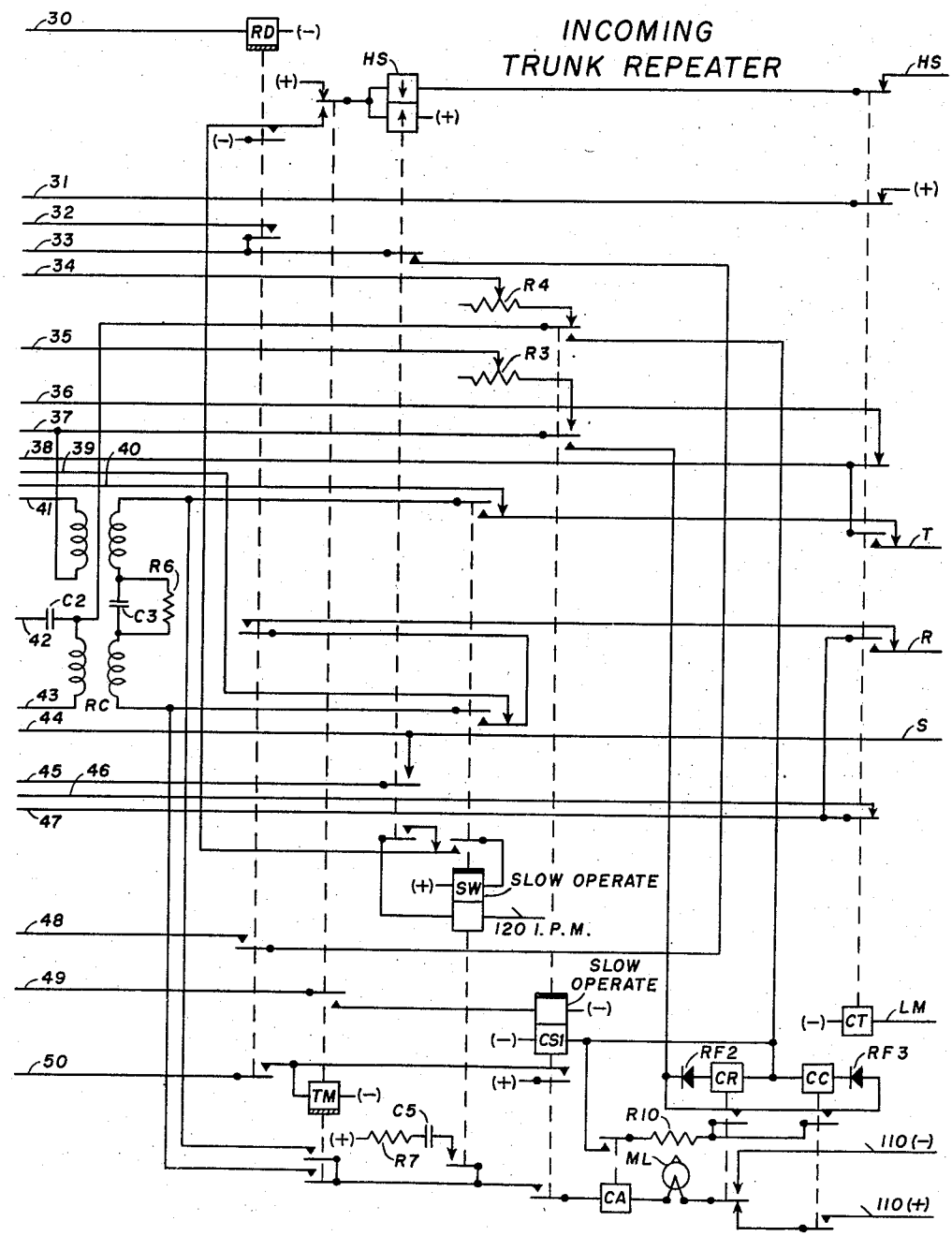
Figure 6:
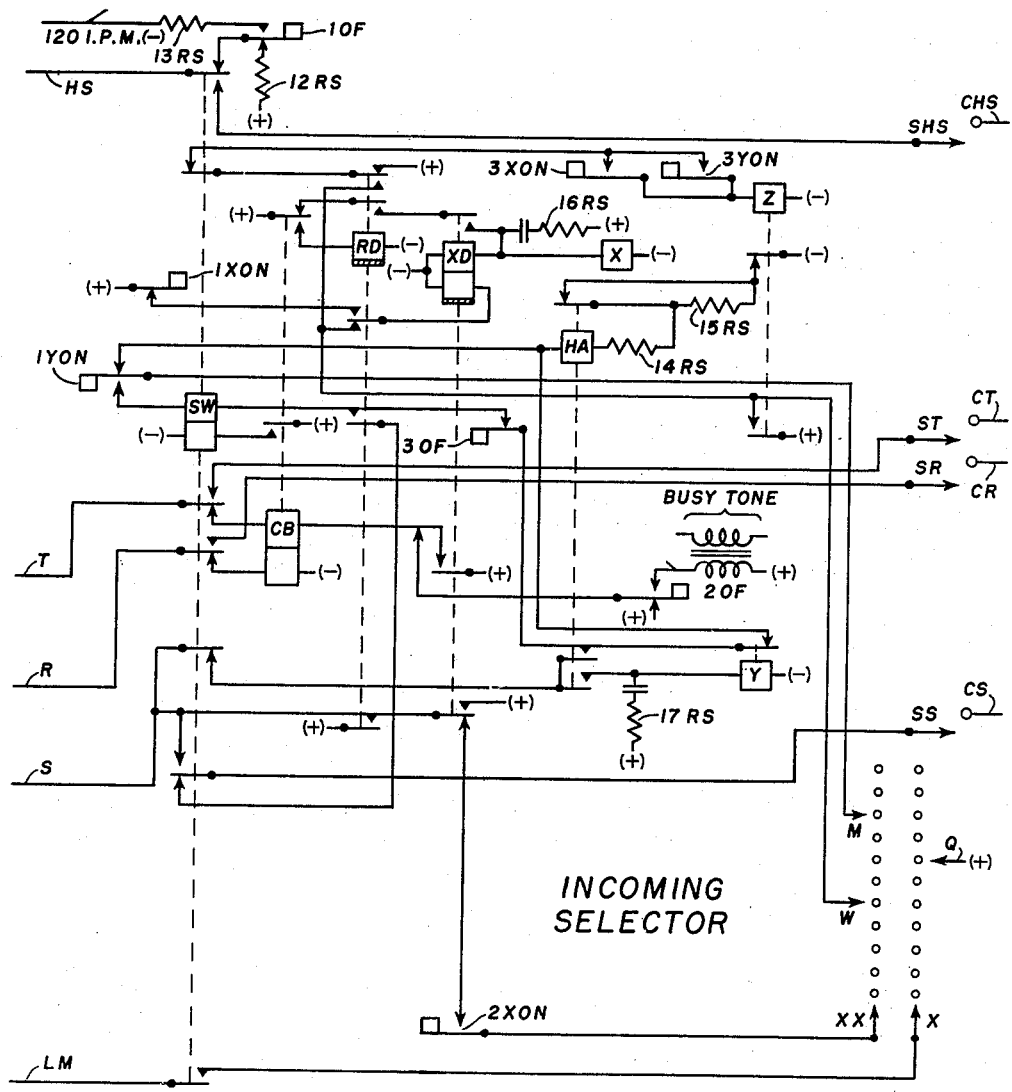
Fig. 6 illustrates an incoming selector associated with the incoming trunk circuit repeater.
Figure 7:
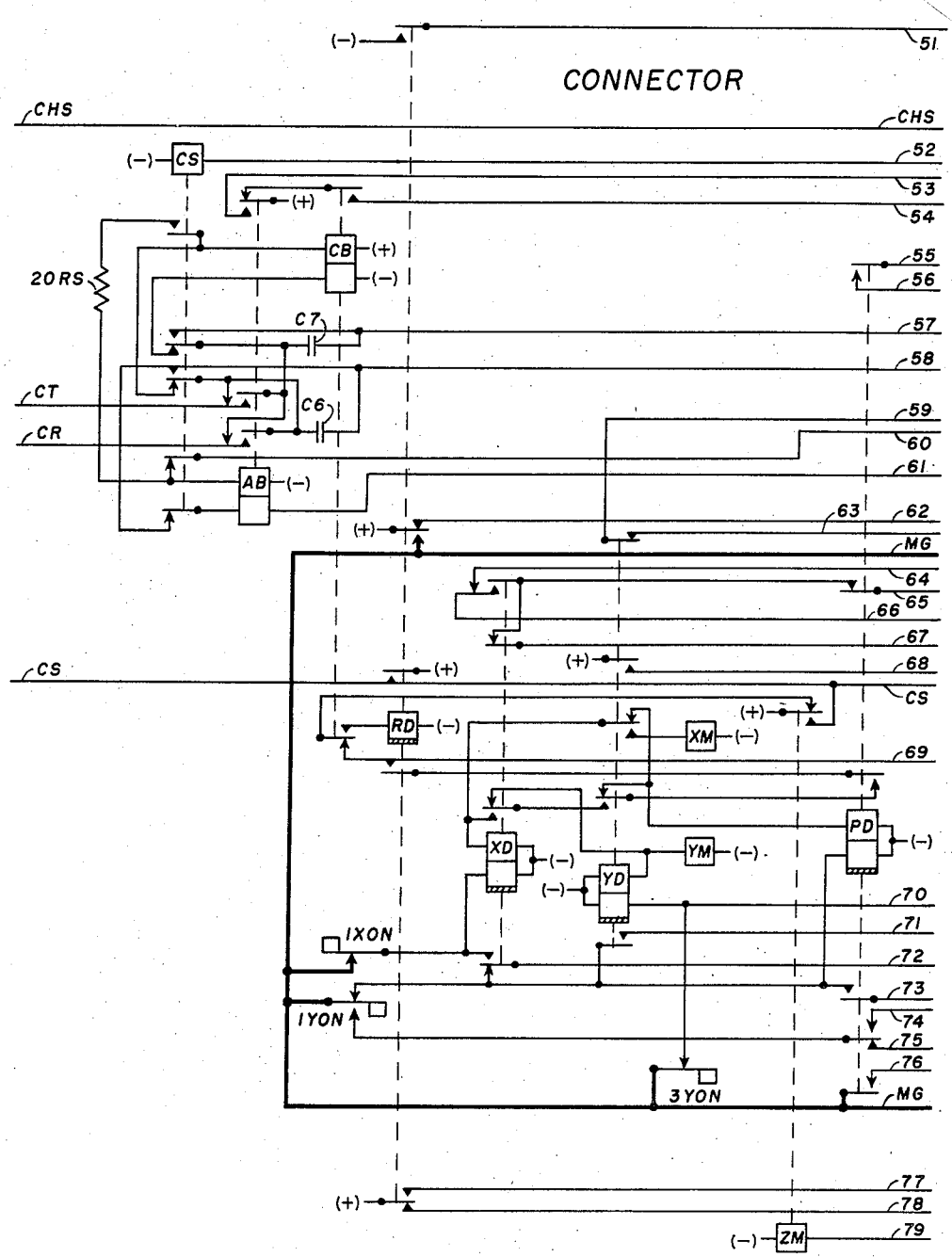
Figs. 7 and 8 illustrate a combination local and toll connector which may be reached from a level of the incoming selector or from a level of a local selector for selecting called line terminals.
Figure 8:
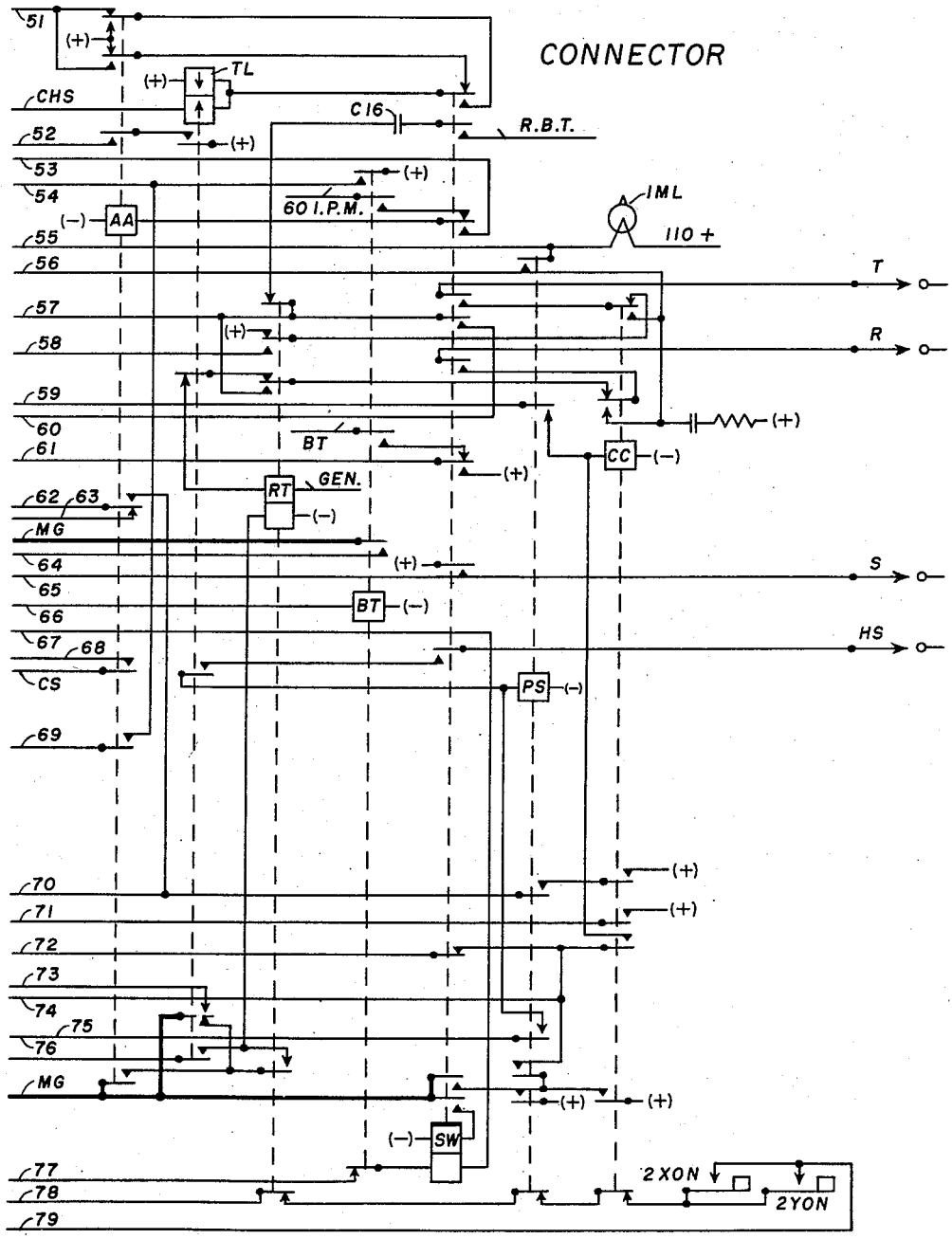
Figure 9:
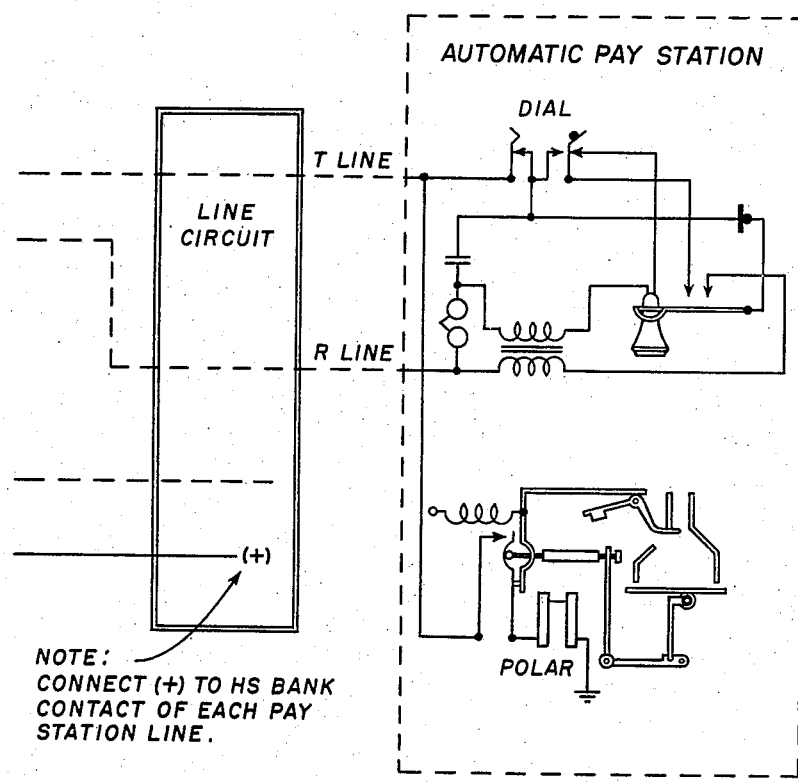
Fig. 9 illustrates the connections to an automatic pay station.

The incoming selector shown in Fig. 6 is of the digit canceling type. Since this particular operation of the selector is immaterial for an understanding of the present invention, it will not be explained at this time. For a complete understanding of the digit canceling operation, reference is made to Fig. 4 of copending application Serial No. 149,072 filed March 11, 1950 and assigned to the same assignee as the present invention.

The control of the HS conductor leading from the HS relay of the incoming trunk and extending through the selector to the connector forms an important feature of the present invention, consequently the circuit conditions of this conductor will be pointed out from time to time as the description progresses. With the circuit operation up to the present point, (+) potential is applied to the HS conductor at both ends, this (+) extending through both windings of the HS relay of the incoming repeater to the HS conductor at this repeater, while (+) is applied to the other end of the HS conductor through resistor 12RS, overflow contact 1OF and break contact of relay SW of the selector.

The circuits are now in condition for responding to the digit dialed for operating the incoming selector. As the dial returns to normal, the impulse contacts are intermittently opened for opening up the above described circuit including relay C of the outgoing repeater, thus causing relay C to intermittently release in response to the dialed impulses. The intermittent release of relay C opens up the above described circuit including the interoffice trunk conductors for intermittently releasing relay CB of the incoming repeater. Relay RD of the incoming repeater remains operated during the impulsing of the associated CB relay, due to its slow acting characteristics. The intermittent operation of relay CB of the incoming repeater opens up the above described circuit including conductors T and R leading to the selector for intermittently operating relay CB of the selector in accordance with the impulses of the dialed digit. The first release of relay CB of the incoming selector closes a circuit for the X magnet of this selector which may be traced from (+), break contact of relay CB, make contact of relay RD, make contact of relay XD and winding of magnet X to (—). The upper winding of relay XD is in multiple with the X magnet so that this relay receives pulses during the stepping of the selector switch and, due to its slow acting characteristics, it remains operated until the termination of the digit at which time it is released.

Referring back to the incoming repeater, the first release of relay CB closes a circuit for operating relay TM extending from (+), break contact of relay CT, break contact of relay CB, break contact of relay LS, make contact of relay RD and winding of relay TM to (—). Since relay TM is of the slow release type, it remains operated until the end of the digit at which time it is released. Relay TM switches the circuit leading to both windings of the HS relay from (+) to (—) at a make contact of relay RD. Since relay HS is differentially connected, this switch from (+) to (—) energizes its lower winding and its upper winding (by way of the previously described HS conductor) in opposition so that the HS relay is not operated at this time. This energization of the HS conductor is of no effect in connection with the selector operation but it is effective when the combination connector is operated, such operation being later described.

When relay XD of the incoming selector releases to mark the end of the digit, a circuit is closed for operating relay HA which may be traced from (+), make contact of relay RD, break contact of relay XD, off normal contact 2XON, XX wiper and terminal to which conductor M is connected, off normal contact 1YON, winding of relay HA, resistor 14RS, break contact of relay HA and break contact of magnet Z to (—). Relay HA is rendered fast to operate because its normally closed break contact short circuits resistor 15RS to provide a high current flow for initially operating relay HA. Relay HA closes a locking circuit for itself extending from (+), make contact of relay RD, break contact of relay SW, make contact of relay HA, break contact of magnet Y and winding of relay HA to (—) over the previously described circuit. A circuit is now closed for operating the Y stepping magnet which may be traced from (+), make contact of relay RD, break contact of relay SW, make contact of relay HA and winding of magnet Y to (—). The operation of magnet Y opens up the above described circuit to relay HA for effecting its release, which in turn opens up the above described circuit for magnet Y for effecting its release. It is not believed necessary to describe the trunk hunting operation of the incoming selector when busy trunks are encountered, this operation being fully described in the above mentioned application Serial No. 149,072.

When the selector finds an idle trunk, relay SW is operated (this relay being primed by energizing its lower winding by way of a make contact of relay CB to make it fast operating) over a circuit extending from (+), make contact of relay RD, break contact of relay XD, off normal contact 2XON, wiper XX and its terminal to which conductor M is connected, off normal contact 1YON, upper winding of relay SW, overflow contact 3OF, break contact of magnet Y and winding of relay HA to (—) over the previously described circuit. It might be mentioned at this time that relay HA is also rendered fast in its release operation because its break contact inserts resistor 15RS in series with its winding, thus reducing the current flow after the relay has operated to a value which is slightly above its holding value. The operation of relay SW switches conductors T and R from the windings of the CB relay to the windings of the CB relay of the selected connector by way of wipers ST and SR and conductors CT and CR, thus releasing relay CB which in turn opens up and releases relay RD. The closure of the CT and CR circuit to the connector operates the CB and RD relays of this connector in a manner presently to be described for extending (+) back over conductor CS and thence by way of wiper SS and a make contact of relay SW to conductor S leading to the incoming repeater for maintaining (+) on this latter conductor during the connection. Relay SW of the selector is locked operated before relay RD of the selector is released, this locking circuit extending from (+) coming back over conductor CS and wiper SS, make contact of relay SW, break contact of relay XD, off normal contact 2XON, wiper XX, conductor M, off normal contact 1YON, upper winding of relay SW, overflow contact 3OF, break contact of magnet Y and winding of relay HA to (—) over over the previously described circuit.

When relay TM of the incoming repeater is released at the termination of the first digit, the HS conductor is switched back to (+) at this repeater, thus placing (+) potential on both ends of the HS conductor for maintaining this conductor de-energized. This conductor is connected to (+) at the connector, after the connector is seized by the selector, by way of windings of the TL relay in the connector and back contacts of relays SW and AA.

When the connector is seized, the circuit for operating the CB relay of this switch may be traced from (+), upper winding of the CB relay, break contact of relay CS, break contact of relay AB, conductor CT, wiper ST of the selector, make contact of relay SW, conductor T, break contact of relay CT of the incoming repeater, break contact of relay SW, make contact of relay CB, break contact of relay SW, make contact of relay RD, break contact of relay CT, conductor R, make contact of relay SW of the selector, wiper SR, conductor CR, break contact of relay AB of the connector, break contact of relay CS and lower winding of relay CB to (—). Relay CB closes a circuit for operating relay RD extending from (+), break contact of connector release magnet ZM, make contact of relay CB and winding of relay RD to (—). Relay RD connects (+) to master ground conductor MG of the connector for controlling various circuit and relay operations as will be later described. Relay XD of the connector is now operated over a circuit extending from (+) on conductor MG, off normal contact 1XON and lower winding of relay XD to (—). Relay YD is also operated at this time over a circuit extending from (+) on conductor MG, off normal contact 3YON and lower winding of relay YD to (—). Relay PD is also operated at this time from (+) on conductor MG, off normal contact 1YON and lower winding of relay PD to (—).

This places the circuits in condition for responding to the tens digit. The operation of the dial for transmitting the impulses of the tens digit is effective to operate relay B of the outgoing trunk repeater when the dial is off normal and to release relay B when the dial returns to normal, with the impulses transmitted from the impulse contacts of the dial being effective to intermittently release relay C of the outgoing trunk repeater, all in the previously described manner. At each release of relay C the inter-office trunk is opened for releasing relay CB of the incoming trunk circuit, which in turn operates relay TM, with relay RD remaining operated during the digit transmission and with relay TM being released at the end of the digit, all in the previously described manner. Relay CB of the incoming trunk repeater repeats the digital impulses to the connector by intermittently opening the trunk conductors T and R leading from the incoming trunk repeater through the selector to the CB relay of the connector, thus relay CB of the connector is pulsed in response to the tens digit. During this pulsing of the CB relay of the connector, relay RD is not released because of its slow acting characteristics. The first release of relay CB of the connector closes a circuit for the X magnet of this switch for advancing the switch in its X or primary direction, this circuit being traced from (+), break contact of magnet ZM, break contact of relay CB, make contact of relay RD, make contact of relay PD, make contact of relay YD, make contact of relay XD, make contact of relay YD and magnet XM to (—). The upper winding of relay XD is connected in multiple with magnet XM, thus the impulses applied to the X magnet maintain relay XD in its operated position uitil the end of the impulse transmission for the tens digit, at which time relay XD is released.

Since this is a toll call, relay TL of the connector is operated at the beginning of the tens digit and released at the end of the tens digit. The circuit for operating relay TL may be traced from (+), break contact of relay AA of the connector, break contact of relay SW, lower winding of relay TL (the upper winding being short circuited at this time), conductor CHS, selector wiper SHS, make contact of relay SW, conductor HS, break contact of relay CT, upper winding of relay HS of the incoming trunk repeater, make contact of relay TM and make contact of relay RD to (—). This circuit does not operate relay HS of the incoming trunk repeater because it is differentially energized at this time. Relay TL of the connector operates to close a circuit for operating the ringing trip relay which may be traced from (+) on conductor MG, make contact of relay PD, make contact of relay TL and lower winding of relay RT to (—). When relay TL is released by the release of relay TM of the incoming trunk repeater at the termination of the tens digits, relay RT is locked operated over a circuit extending from (+) on conductor MG, break contact of relay TL, make contact and lower winding of relay RT to (—). It will be understood that relay TL of the connector is released at the end of the tens digit because relay TM connects (+) to the HS conductor for de-energizing the lower winding of relay TL.

The units digit is now transmitted, the impulses from the dial operating the C and B relays of the outgoing trunk repeater in the previously described manner for transmitting the units digital impulses over the interoffice trunk, for impulsing relay CB of the incoming trunk repeater, for operating relay TM at the beginning of the digit and for releasing this relay at the end of the digit, all in the previously described manner. Relay CB of the incoming trunk repeater pulses the T and R conductors leading to relay CB of the connector for causing this relay to repeat the pulses of the units digit. Relay TL of the connector is again operated, by means of the previously described circuit, at the beginning of the digit and released at the end of the digit. The release of relay CB closes a circuit for operating the Y or secondary stepping magnet which may be traced from (+), break contact of magnet ZM, break contact of relay CB, make contact of relay RD, make contact of relay PD, make contact of relay YD, break contact of relay XD and winding of magnet YM to (—). The upper winding of relay YD is connected in parallel with magnet YM, thus maintaining relay YD in its operated position until the end of the units digit, at which time relay YD is released. At the first Y step of the connector switch, the previously described operating circuit for relay PD is opened but a first locking circuit is closed for this relay which may be traced from (+) on conductor MG, make contact IYON, make contact of relay PD, break contact of relay SW, break contact of relay XD and lower winding of relay PD to (—). When relay TL operates at the beginning of the units digit, the above described locking circuit for relay RT is opened but the previously described operating circuit for this relay is closed for maintaining the relay energized until the end of the units digit, at which time the locking circuit for relay RT is again closed.

The station digit is now transmitted from the dial at the toll operator's position, with relays C and B of the outgoing trunk repeater being operated to repeat the impulses of this digit over the inter-office trunk for causing relay CB of the incoming trunk repeater to repeat the impulses over the trunk conductors leading to the connector. Relay TM of the incoming trunk repeater is operated and released as before for operating and releasing relay TL of the connector. The release of relay CB of the connector at the beginning of the first impulse of the station digit closes a circuit for operating relay XD extending from (+), break contact of magnet ZM, break contact of relay CB, make contact of relay RD, make contact of relay PD, break contact of relay YD, another break contact of relay YD and upper winding of relay XD to (—). Relay XD closes a locking circuit for itself extending from (+) on conductor MG, off normal contact IYON, make contact of relay PD, break contact of relay SW, make contact and lower winding of relay XD to (—). Relay XD opens the first locking circuit of relay PD but relay TL (operated) closes a second locking circuit for relay PD extending from (+) on conductor MG, make contact of relay TL, make contact and lower winding of relay PD to (—). A third locking circuit is closed for relay PD while relay CB is released which extends from (+), break contact of magnet ZM, break contact of relay CB, make contact of relay RD, make contact of relay PD, break contact of relay YD and upper winding of relay PD to (—). The release of relay TL at the end of the station digit closes the above described locking circuit for relay RT so that this relay remains operated at the end of this digit. With relay CB operated, with relay TL released and with relay XD operated the third, second and first locking circuits for relay PD are opened for releasing this relay. The release of relay PD opens up the above described locking circuit for relay XD for releasing this relay.

*Line seizure*

Assuming that the called line is idle, relay SW of the connector is operated at the end of the station digit over a circuit which may be traced from (+), make contact of relay RD, break contact of relay BT, lower winding of relay SW, break contact of relay XD, break contact of relay PD, wiper S and terminal of the called idle line to (—) through the winding of the cut off relay of the called line circuit (not shown) to (—). Relay SW applies (+) to wiper S for making the called line busy and for operating the cut off relay associated with this line. Relay SW also closes a locking circuit for itself extending from (+) on conductor MG, make contact and upper winding of relay SW to (—).

When the operator restores the dial key of the cord circuit, relay DL is released, thus disconnecting (—) from ring conductor R leading to the outgoing trunk repeater for releasing relay C. The tip conductor T is also open at this time for releasing relay B. When relay SW of the connector operates, the CHS conductor is switched from (+) to (—) for closing an operating circuit for relay HS of the incoming trunk repeater, this circuit being traced from (+), break contact of relay TM, upper winding of relay HS (the lower winding of this relay now being short circuited), break contact of relay CT, conductor HS, make contact of relay SW of the selector, wiper SHS, conductor CHS, both windings of relay TL to (+), a branch circuit being now extended through a make contact of relay SW, a break contact of relay AA and a make contact of relay RD to (—). This energizes both windings of relay TL in opposition so that this relay is not operated at this time. Relay LS of the incoming trunk repeater is now operated over a circuit extending from (+) on conductor S, make contact of relay HS and winding of relay LS to (—). Relay LS closes a locking circuit for itself extending from (+) on conductor S and a make contact of relay LS to the winding of this relay, this circuit being independent of the make contact of relay HS, thus holding relay LS operated independent of the operation of the HS relay. Relay SW of the incoming trunk repeater is now operated over a circuit which may be traced from a (+) pulse on the common 120 IPM conductor, lower winding of relay SW, make contact of relay HS, break contact of relay SW and make contact of relay RD to (—). Relay SW closes a locking circuit for itself extending from (+), upper winding of relay SW, make contact of relay SW and make contact of relay RD to (—). The lower winding of relay SW is opened at its break contact.

The operation of relay LS of the incoming trunk repeater reverses the trunk circuit conductors TT and TR thus reversing the battery back over the trunk to the outgoing trunk repeater. The trunk is now energized by way of a circuit which may be traced from (+), upper winding of relay CB of the incoming trunk repeater, rectifier RF4, break contact of relay SR, break contact of relay RG1, resistor R3, break contact of relay CS1, upper left hand winding of repeat coil RC, make contact of relay LS, break contact of relay CT, inter-office trunk conductor TR, break contact of relay K of the outgoing trunk repeater, break contact of relay H, lower right hand winding of repeat coil RC, break contact and lower winding of relay E, upper right hand winding of repeat coil RC, break contact of relay B, make contact of relay A, break contact of relay K, tip trunk conductor TT, break contact of relay CT of the incoming trunk repeater, make contact of relay LS, lower left hand winding of repeat coil RC, break contact of relay CS1, resistor R4, break contact of relay RG1, break contact of relay SR and lower winding of relay CB to (−). Relay E of the outgoing trunk repeater was primed by the operation of relay A over a circuit extending from (+), make contact of relay A, resistor 2R and upper winding of relay E to (−). Now when the current is reversed over the trunk line, as above described, the current flow through the lower winding of relay E is in the proper direction to assist that in its upper winding so that relay E is operated. The operation of relay E closes a make contact which short circuits resistor 2R, thus removing this resistance from the circuit of the upper winding of this relay so that relay E will remain operated by means of its upper winding independent of any current flow through its lower winding. Relay R is inserted in the inter-office trunk circuit when relay E operates and opens up its inner lower break contact for removing the short circuit from the winding of the R relay. Relay F is operated in response to the operation of relay E over a circuit extending from (+), make contact of relay A, make contact of relay E and winding of relay F to (−). The operation of relay F opens up the previously described operating circuit for relay L but this relay is not released at this time because of a locking circuit extending from (+), make contact of relay A, make contact of relay E, make contact of relay G (operated by means of an obvious circuit closed by the operation of relay R), make contact and winding of relay L to (−). Relay P is now operated over a circuit extending from (+), lowermost break contact of relay N (it being assumed that the X connection instead of the Y connection is used in this circuit), make contact of relay G, break contact of relay J, make contact of relay F and winding of relay P to (−). The operation of relay P closes a circuit from (+) through the low resistance upper winding of relay A to the sleeve conductor leading to the trunk jack and cord circuits, the current flow in this circuit being sufficiently high to operate marginal relay SL in the cord circuit for closing an obvious circuit to signal lamp SIG, thus giving the operator a visual signal that the called line has been seized and that ringing may be effected at any time.

*Delayed ring*

These circuits are so arranged that the operator may seize the called line, in the manner just described, hold off the ringing operation until she is ready to signal the called station. This is effective because relay RT of the connector has been operated and locked as previously explained. The operator may leave the connection in this condition and work on the other portion of the toll cord circuit, for example, before ringing the called station. In the event that the called station, or another station on the called line, if it is a party line, removes the receiver, the operator will get a signal to this effect. This is accomplished because the called line circuit is extended through connector wipers T and R to the windings of relay AB. This circuit may be traced from connector wiper T, make contact of relay SW, break contact of relay CC, make contact of relay RT, break contact of relay CS, lower winding of relay AB and make contact of relay SW to (+). The circuit from the R wiper extends through a make contact of relay SW, break contact of relay CC, make contact of relay RT, another make contact of relay SW, break contact of relay CS and upper winding of relay AB to (−).

Consequently, if a party on the called line removes the receiver, relay AB is operated for closing a circuit for operating relay AA extending from (+), make contact of relay AB, make contact of relay SW and winding of relay AA to (−). Relay AA switches the above described circuit, including conductor CHS, from (−) (at a make contact of relay RD) to (+) at a make contact of relay AA. This means that (+) is applied to both ends of the HS conductor, since relay TM of the incoming trunk repeater is released at this time. Therefore, relay HS of the incoming trunk repeater is released for closing a circuit for operating relay SR extending from (+), break contact of relay CT, make contact of relay CB, make contact of relay RD, break contact of relay HS, make contact of relay RD, make contact of relay LS and winding of relay SR to (−). The operation of relay SR disconnects the inter-office trunk conductors from the above described circuit leading to the CB relay. Relay SR places a closed circuit across the CB relay, including resistor R1, to prevent the release of this relay under this condition. The tip trunk conductor TT may now be traced through a break contact of relay CT, make contact of relay LS, lower left hand winding of repeat coil RC, break contact of relay CS1, resistor R4, break contact of relay RG1, make contact of relay SR, resistor R2, break contact of relay RS, break contact of relay CS, winding of relay RS (high resistance, 6500 ohms, for example) make contact of relay RD, make contact of relay CB and break contact of relay CT to (+). The ring trunk conductor TR may now be traced through a break contact of relay CT, make contact of relay LS, upper left hand winding of repeat coil RC, break contact of relay CS1, resistor R3, make contact of relay LS, winding of relay CS (high resistance, 6500 ohms, for example), resistor R9 and break contact of relay RG to (+).

It will thus be seen that the inter-office trunk is switched from a wet to a dry condition when a party removes the receiver on the called line, since the trunk circuit is not energized under this condition, both sides of which extend to (+) through high resistance coils. This dry condition of the inter-office trunk effects the release of relay R in the out-going trunk repeater, which in turn opens up and releases relay G which in turn opens up the above described locking circuit for relay L for effecting the release of this relay. Relay L released and relay P released removes (+) from the low resistance winding of relay A, thus inserting the high resistance winding of this relay in the sleeve circuit for releasing relay SL of the cord circuit, which in turn extinguishes lamp SIG to give the operator a visual indication that a subscriber on the called line has removed the receiver. It will be understood that relay A of the outgoing trunk repeater is not released under this condition because of a circuit through its lower high resistance winding to (+). The operator may, of course, go in on the connection and give the party on the called line the proper instructions under this condition.

Ring start

With the circuits in the condition above described, that is, an idle called line selected, the operator may start the ringing of the called station when she is ready to signal this station by operating the ring key associated with the cord circuit. This key operation applies (−) through the resistance coil to the ring side of the cord and jack circuit by way of a break contact of relay DL. This circuit may now be traced by way of conductor R, lower left hand winding of the repeat coil RC of the outgoing trunk repeater, make contact of relay F, break contact of relay H, make contact of relay F and winding of relay K to (+). Relay K operates and switches the inter-office trunk conductors from the circuit leading into the outgoing trunk repeater to ground and generator, the generator conductor being connected to trunk TR and the ground conductor being connected to trunk TT. This opening of the circuit into the repeater effects the release of relay R but relay G is not released because of a circuit to (+) for this relay at a make contact of relay K. Relay K also applies a holding circuit to relay L. The ground connected to trunk conductor TT extends through the previously described circuits of the incoming trunk repeater to the lower winding of relay CB for holding this relay operated during the ringing condition. The generator applied to trunk conductor TR operates relay RG of the incoming trunk repeater over a circuit which may be traced from conductor TR, break contact of relay CT, make contact of relay LS, upper left hand winding of repeat coil RC, break contact of relay CS1, resistor R3, make contact of relay LS, relay RG and rectifier RF1 in multiple, condenser C4, make contact of relay LS, resistor R4, break contact of relay CS1, lower left hand winding of repeat coil RC, make contact of relay LS, break contact of relay CT, conductor TT and make contact of relay K to ground. This operates the RG relay which in turn closes an obvious circuit for operating relay RG1.

When the ringing key at the cord circuit is restored, relay K releases for again energizing the operating relay R. The release of relay K also disconnects generator from the trunk circuit for effecting the release of relays RG and RG1 of the incoming trunk repeater. At the time of the RG1 relay operation the circuit to the CB relay is opened for effecting the release of this relay and when relay RG1 releases at the end of the ringing signal, relay CB is again operated. Relay TM is also operated over a circuit extending from (+), make contact of relay RG1, make contact of relay RD and winding of relay TM to (−). The TM relay is released when relay RG1 releases to open up the above described circuit. Relay RD is not released during this ringing operation because of a circuit extending from (+), make contact of relay RG1, break contact of relay RS and winding of relay RD to (−). The operation of relay TM switches the HS conductor from (+) to (−) at a make contact of relay RD, thus holding relay HS operated by way of its lower winding. This (−) applied to the HS conductor extends to the lower winding of relay TL of the connector and, since this relay is now unbalanced it is operated for opening up the above described locking circuit for relay RT, thus effecting the release of this relay. The release of relay TM of the incoming trunk repeater, at the termination of the ringing signal from the distant office, switches the HS conductor back to (+) for releasing relay TL of the connector because this energizes both windings of this relay in opposition, the circuit to (−) extending through a make contact of relay SW, break contact of relay AA and a make contact of relay RD. With relays TL and RT released, the called station is rung over a circuit extending from the common generator source GEN, upper winding of relay RT, break contact of relay TL, break contact of relay RT, break contact of relay CC, make contact of relay SW, wiper R, over the called line circuit, wiper T, make contact of relay SW, break contact of relay CC and break contact of relay RT to (+). At this time ring back tone is applied to the calling trunk over a circuit extending from the common ring back tone conductor RBT, make contact of relay SW, condenser C16, break contact of relay RT, condenser C7, break contact of relay AB, conductor CR, wiper SR of the selector, make contact of relay SW, conductor R, break contact of relay CT, make contact of relay RD, make contact of relay SW, right hand windings of repeat coil RC, make contact of relay SW, break contact of relay CT, conductor T, make contact of relay SW of the selector, wiper ST, conductor CT, break contact of relay AB of the connector, break contact of relay CS and upper winding of relay CB to (+). This tone through the right hand windings of the repeat coil induces a tone in the left hand windings of this coil to which the trunk conductors are connected, thus the operator in the distant office hears the ring back signal.

Talk and supervision

When the called party removes the receiver to answer the call, relay RT is operated, since the upper winding of this relay is in the signaling circuit connected to the called line. Relay RT closes a locking circuit for itself extending from (+) on conductor MG, break contact of relay TL, make contact and lower winding of relay RT to (−). Answering bridge relay AB of the connector is now operated over a circuit including the closed called line circuit, this circuit being traced from (+), make contact of relay SW, lower winding of relay AB, break contact of relay CS, make contact of relay RT, break contact of relay CC, make contact of relay SW, wiper T and over the called line and substation circuits in series, wiper R, make contact of relay SW, break contact of relay CC, make contact of relay RT, make contact of relay SW, break contact of relay CS and upper winding of relay AB to (−). It will be noted that relay AB reverses the battery back over the trunk conductors to the selector which is in connection with this connector. This reverse battery is of no effect in connection with a toll call, since the battery is extended back through the right hand windings of repeat coil RC of the incoming trunk repeater, with no relay connected in this circuit. The reverse battery is effective in connection with a local call, such a local call being by way of a selector (not an incoming selector) in another group to which a calling line is connected which may require reverse battery for metering or supervision purposes. Relay AB closes a circuit for operating relay AA of the connector extending from (+), make contact of relay AB, make contact of relay SW and winding of relay AA to (—). Relay AA switches the HS conductor from (—) to (+) at its uppermost make contact. This results in (+) potential being applied to both ends of the HS conductor, since relay TM of the incoming trunk repeater is released at this time. Consequently, relay HS of the incoming trunk repeater is released and relay TL of the connector is released at this time. The release of relay HS of the incoming trunk repeater closes a circuit for operating relay SR which may be traced from (+), break contact of relay CT, make contact of relay CB, make contact of relay RD, break contact of relay HS, make contact of relay RD, make contact of relay LS and winding of relay SR to (—). Relay SR changes the inter-office trunk from a wet to a dry condition by disconnecting the windings of the CB relay of the incoming trunk repeater from the inter-office trunk conductors.

It now becomes necessary to provide a substitute holding circuit for the CB relay of the incoming trunk repeater. This holding circuit may be traced from (+), upper winding of relay CB, rectifier RF4, make contact of relay SR, resistor R1 and lower winding of relay CB to (—). Since the inter-office trunk is now in a dry condition (no battery flow over the trunk) relay R in the outgoing trunk repeater is de-energized and released. The release of relay R opens up and releases relay G, which in turn opens up and releases relay P. Relay M is now operated over a circuit extending from (+), make contact of relay A, make contact of relay E, break contact of relay G and winding of relay M to (—). Relay M closes an obvious circuit for operating relay N. The release of relay G opens up the above described locking circuit for relay L and, since the operating circuit for the L relay is open at a break contact of relay F, relay L is released. The release of relay L disconnects (+) from the low resistance winding of relay A for providing a high resistance circuit to relay SL of the cord circuit, thus releasing this relay and extinguishing lamp SIG as an indication to the operator that the called party is on the line. The talking circuit is now established, with battery being fed to the called line by way of the AB relay windings of the connector circuit, with the called line circuit being connected to the right hand windings of repeat coil RC of the incoming trunk repeater by way of condensers C6 and C7 of the connector, with the left hand windings of the incoming trunk repeater repeat coil being connected to the inter-office trunk circuit in the terminating office, with the right hand windings of repeat coil RC of the outgoing trunk repeater being connected to the trunk conductors in the originating office and with the left hand windings of the outgoing trunk repeater repeat coil being connected to the toll cord circuit. It will be understood that a toll line circuit may be connected to the opposite cord (not shown) of the toll board cord circuit.

When the called party hangs up the receiver, relay AB is released for opening up and releasing relay AA of the connector. The release of relay AA switches the HS conductor back to (—) at the uppermost make contact of relay RD. Since relay TL is now differentially energized, it will not be operated at this time. Relay HS of the incoming trunk repeater is energized by this switch in potential on the HS conductor. The operation of relay HS opens up and releases relay SR, which in turn re-connects the windings of relay CB of the incoming trunk repeater to the inter-office trunk circuit, thus energizing the inter-office trunk for operating relay R in the outgoing trunk repeater. Relay R closes an obvious circuit for operating relay G, and relay G closes the above described circuit for operating relay P. The operation of relay P applies (+) to the sleeve of the jack and cord circuits by way of the low resistance winding of relay A for operating relay SL of the cord circuit, this relay in turn closing the circuit for lighting lamp SIG as an indication to the operator that the called party has hung up the receiver. The operator of relay G opens up and releases relay M and this relay in turn opens up and releases relay N.

*Re-ring*

The circuits are now in condition for the operator to re-establish the ringing of the called line if so desired. This is brought about in the same manner as the original ringing circuit, previously described. That is, the ringing key applies (—) to the ring side of the outgoing trunk repeater for operating relay K and this relay in turn applies generator to the ring trunk conductor and ground to the tip trunk conductor, the generator operating relay RG of the incoming trunk repeater and the ground holding relay CB of this repeater to prevent release operations of the circuit. Relay RG closes an obvious circuit for operating relay RG1 and this relay in turn operates relay TM for switching the HS conductor from (+) to (—). This switch in the HS conductor operates relay TL, in the previously described manner for opening up the locking circuit of relay RT of the connector, thus re-establishing the ringing circuit. The remainder of the circuit operations, supervision and called station response, are the same as previously described.

*Release after called party has hung up*

When the operator gets the above described supervision indicating that the called party has hung up the receiver, she may remove the plug from the trunk jack for effecting the release of relay SL of the cord circuit and relay A of the outgoing trunk repeater. This restores the cord circuit to normal and the release of relay A opens up and releases relays 1SA and 2SA in sequence. The release of relay A also effects the release of relays E and F by removing (+) from the circuits of these relays at the uppermost make contact of the A relay. The release of relay A also opens up the inter-office trunk circuit for releasing relay R, this relay in turn opening up and releasing relay G. Relay F opens up and releases relay P, thus the outgoing trunk repeater circuits are restored to normal and the inter-office trunk conductors are opened at the originating office.

The opening of the inter-office trunk at the originating office releases relay CB of the incoming trunk repeater for opening up and releasing relay RD, this relay in turn opening up and releasing relay SW, thus restoring the incoming trunk repeater circuits to normal. Since relays SW and CB of the incoming trunk repeater are now released, the trunk conductors leading to the connector are de-energized for effecting the release of relays CB and RD of the connector circuit. Relay RD disconnects (+) from conductor MG for releasing relays RT and SW. The release of relay SW disconnects (+) from connector sleeve wiper S and the switch is released by means of a circuit extending from (+), break contact of relay RD, break contacts in series of relays RT, PS and CC, X and Y off normal contacts 2XON and 2YON and winding of magnet ZM to (—). When the switch is restored to normal, the X and Y off normal contacts are opened for de-energizing magnet ZM, thus restoring the connector circuits to normal.

Relay RD of the connector disconnects (+) from conductor CS for rendering the connector circuit idle (magnet ZM applies (+) to conductor CS momentarily for protecting the connector circuit until the switch is completely restored to normal) and for releasing relay SW of the incoming selector. The release of relay SW closes an obvious circuit through break contacts of relays RD and SW for releasing the selector switch, thus restoring the selector to normal. This restores all circuits used in the connection to normal, conductor HS being connected to (+) at both ends for controlling operations in the previously described manner in connection with the next call.

*Release before called party has hung up*

From the above description it will be observed that, due to the interoffice trunk being dry while the called party is on the line, relay CB of the incoming trunk repeater is energized locally and not over the trunk circuit. This means that some additional arrangement must be provided for releasing the connection under this condition. This release function is provided by the 1SA and 2SA relays of the outgoing trunk repeater. When the operator takes down the connection under this condition, relay A is released for releasing relays 1SA and 2SA in sequence, as previously pointed out. When relay A releases and before relay 2SA has released, (—) is connected to tip trunk conductor TT for operating relay RS of the incoming trunk repeater over a circuit which may be traced from (—), resistor 19RS, make contact of relay 2SA, break contact of relay A, break contact of relay K, trunk conductor TT, break contact of relay CT of the incoming trunk repeater, make contact of relay LS, lower left hand winding of repeat coil RC, break contact of relay CS1, resistor R4, break contact of relay RG1, make contact of relay SR (operated at this time to render the inter-office trunk dry), resistor R2, break contact of relay RS, break contact of relay CS, winding of relay RS, make contact of relay RD, make contact of relay CB (held operated through make contacts of relay SR) and break contact of relay CT to (+). Relay RS operates and closes a locking circuit for itself to (—) by way of its make-before-break contact and over the previously described circuit to (+), this circuit remaining closed until relay RD is released, the release of the RD relay being effected by the opening of the break contact of relay RS. The release of relay RD effects the release of relay SR and the restoration of the circuits of the incoming trunk repeater to normal, including the release of relay RS and any other relays of this circuit which are operated at this time. The trunk conductors leading to the selector and connector are opened by the release of relay CB of the incoming trunk repeater for releasing the selector and connector circuits. This trunk circuit leading to the selector and connector circuits is, of course, switched to contacts of the CB relay when relay SW is released by the release of relay RD.

*Switching through operation of incoming trunk repeater*

In some installations it is required that the inter-office trunk conductors be connected straight through to the battery feed circuit of the connector, thus removing repeat coil RC of the incoming trunk repeater from the circuit. On selector levels at which this operation is required, the Q wire is connected to the terminals of the X wiper of the selector, as indicated by Note 3 on the Fig. 6 drawing. When the selector switches through to the connector on such a level, the operation of the selector SW relay closes a circuit for operating relay CT of the incoming trunk repeater, this circuit being traced from (+), conductor Q, wiper X, make contact of relay SW, conductor LM and winding of relay CT to (—). Relay CT switches inter-office trunk conductors TT and TR directly through to trunk conductors T and R leading to the connector by way of the selector wipers. Relay CT opens up the HS conductor for canceling the HS control on a call of this class and it disconnects (+) from the contact of relay CB to prevent the operation of the TM relay on this type of call. It will thus be seen that, on a call of this class, the incoming trunk repeater operates to repeat impulses to the incoming selector but after this selector seizes the connector, all relays of the incoming trunk repeater are de-energized except relay CT so that the inter-office trunk control is now directly to the CB relay of the connector, thus removing all repeat coils in the terminating office from the trunk. When the connection is released, the release of the SW relay of the incoming selector opens up and releases relay CT of the incoming trunk repeater for restoring the circuits of this repeater to normal.

*Call to busy line*

It will be recalled that relays PD and XD are released in sequence following the receipt of the station digit by the connector. With relay PD released and before relay XD is released a circuit is closed for operating relay BT extending from (+) on the sleeve terminal of the called busy line, wiper S, break contact of relay PD, make contact of relay XD and winding of relay BT to (—). The opening of the lowermost break contact of relay BT opens up the operating winding of relay SW to prevent the operation of this relay on a call to a busy line. Busy tone is connected back to the calling line over a circuit extending from common busy tone conductor BT, make contact of relay BT, break contact of relay SW, lower winding of relay AB, break contact of relay CS, condenser C6, break contact of relay AB and over conductor CT and wiper ST of the selector to the repeat coil of the incoming trunk repeater, at which point the tone is repeated to the calling line by means of the induced current from the right hand winding of this coil to the left hand winding, to which the calling line is connected.

With relay BT of the connector operated, a circuit is closed for intermittently operating relay AA, this circuit extending from the common flash interrupter designated 60 I. P. M., make contact of relay BT, break contact of relay SW and winding of relay AA to (—). Relay AA is intermittently operated for providing a 60 I. P. M. flash to the operator at the toll board. Each operation of relay AA switches the right hand terminals of relay TL of the connector from (+) to (—) at the uppermost make contact of relay RD.

This does not operate relay TL because of its differential connection, but it does operate relay HS of the incoming trunk circuit, consequently relay HS is intermittently operated to repeat the flash interrupter signals from the connector. The first operation of relay HS of the incoming trunk repeater closes a circuit for operating relay SS extending from (+) on conductor S, make contact of relay HS and winding of relay LS to (—). Relay LS is locked operated to (+) on conductor S over a circuit which is independent of the make contact of the HS relay. Relay SW is operated at this time over a circuit extending from (+) on common conductor 120 I. P. M., lower winding of relay SW, make contact of relay HS, break contact of relay SW and make contact of relay RD to (—). Relay SW locks itself operated over a circuit extending from (+), upper winding of relay SW, make contact of relay SW and make contact of relay RD to (—). Relay LS reverses the trunk line conductors extending back to the originating office and relay SW switches the trunk conductors leading to the connector from a circuit including the make contact of relay CB to the right hand windings of repeat coil RC. When relay HS is released, following its first operation, relay SR is operated over a circuit which may be traced from (+), break contact of relay CT, make contact of relay CB, make contact of relay RD, break contact of relay HS, make contact of relay RD, make contact of relay LS and winding of relay SR to (—). At the next operation of relay HS, this SR relay circuit is opened for releasing this relay, consequently relay SR follows the intermittent operations of relay HS.

When relay LS of the incoming trunk repeater reverses the trunk line conductors, relay E is operated and locked in the previously described manner. Relay E inserts the winding of relay R in the trunk circuit for operating this relay and relay F is operated over the previously described circuit including a make contact of relay E. Relay R choses an obvious circuit for operating relay G and relay G closes a circuit for operating relay P extending from (+), break contact of relay N, make contact of relay G, break contact of relay J, make contact of relay F and winding of relay P to (—). From the above description it will be observed that relay SR of the incoming trunk repeater is intermittently operated for flashing the inter-office trunk with intermittent wet and dry conditions. This is effective to intermittently energize relay R of the outgoing trunk circuit for intermittently operating relay G, which in turn effects the intermittent operation of relay P. Relay P intermittently applies (+) potential through its uppermost make contact to the low resistance winding of relay A for intermittently operating relay SL of the cord circuit, thus providing an intermittent flash of lamp SIG. Since the busy tone is coming back over the inter-office trunk circuit, the operator receives this tone as well as receiving an intermittent visual indication that the called line is busy by the 60 cycles flash of lamp SIG.

When the operator takes down the connection, relays SL and A are released for releasing all of the equipment in the previously described manner.

*Call to busy trunk group*

It will be assumed that all connectors of the connector group are busy, thus the incoming selector goes to overflow for switching the overflow contacts of the sleector of Fig. 6. Relays SW of the selector is not operated on this call because its upper winding is opened at overflow contact 30F. It will be observed that overflow contact 20F applies busy tone back over conductor T to the incoming trunk repeater, but this circuit is not connected to the repeat coil winding unless relay SW of the repeater is operated. Relay SW does not operate on this call because the 120 I. P. M. pulses operate relay HS over a circuit extending from (+), break contact of relay TM, upper winding of relay HS, break contact of relay CT, conductor HS, break contact of relay SW, overflow contact 10F and resistor 13RS to the 120 I. P. M. (—) pulse source. This same source of (—) pulses is applied to the lower winding of relay SW of the incoming trunk repeater, it being understood that during the intervals between these (—) pulses the 120 I. P. M. common conductor is connected to (+). Consequently, while relay HS is operated by the (—) pulses, relay SW cannot be operated through the make contact of relay HS because (—) is applied to both terminals of the lower winding of relay SW. During the interval between these (—) pulses, the (+) potential on common conductor 120 I. P. M. does not complete a circuit through the lower winding of relay SW because, at this time, relay HS is released for opening up this lower winding. This means that relay HS will be intermittently operated to provide a 120 I. P. M. signal back to the operator's position but the operator will not hear the busy tone because the busy tone circuit is disconnected from the repeat coil of the incoming trunk repeater to which the operator's talking circuit is connected. The release of the connection on a call of this class is by the release of relay A, when the operator takes down the connection, for effecting the release of the other portions of the equipment, all in the previously described manner.

*Automatic coin control*

It will first be assumed that the operator takes down the connection after the called party has hung up the receiver and that the automatic coin collect operation is to be effected. If the coin is to be returned, the operator applies coin return battery to the called line while the called party still has the receiver off the hook, this operation being described later.

In accordance with the note relating to the connection of HS bank terminals of the connector, it will be obvious that relay PS is operated on a call from toll to a paystation line. The circuit may be traced from (+) on the HS terminal associated with the called line, wiper HS, make contact of relay SW, make contact of relay TL and winding of relay PS to (—). Relay PS locks itself operated over a circuit extending from (+) on conductor MG, off normal contact 1YON, break contact of relay PD, make contact and winding of relay PS to (—). With the receiver at the called station hung up, relays AB and AA are in their de-energized conditions, consequently (—) from the make contact of relay RD is extended through break contact of relay AA and make contact of relay SW to both windings of relay TL to the HS conductor and, since this conductor is connected to (+) at the break contact of relay TM of the incoming trunk repeater, the HS conductor is energized but relay TL of the connector is not operated because of its differential connections. Relay HS of the incoming trunk repeater is operated because its lower winding is short circuited and its upper winding is energized.

The operation of relay HS at this time provides the previously described wet supervision. When the connection is released, in the previously described manner, when the operator takes down the connection, relays CB and RD of the connector are released. Relay RD disconnects (+) from conductor MG but relay PS maintains (+) on this conductor by way of a circuit extending through make contacts of relays PS and SW. This same circuit locks all of the relays operated which were previously locked to the MG conductor. Since the release magnet of the connector switch is open at a break contact of relay PS, the switch is not released. The release of relay RD disconnects (+) from sleeve conductor CS so that the selector and incoming trunk repeater circuits are restored to normal.

Coin collect relay CC is now operated over a circuit which may be traced from (+), break contact of relay RD, break contact of relay AA, break contact of relay YD, make contact of relay PS and winding of relay CC to (−). Relay CC closes a first locking circuit for itself extending from (+), make contacts in series of relay PS, make contact and winding of relay CC to (−). 110(+) is now applied to the called line for operating the coin collect apparatus at the substation on this line, this circuit being traced from 110(+), lamp IML, make contact of relay PS, make contact of relay CC, make contact of relay SW and wiper R to the ring side of the called line. This same circuit is extended by way of another make contact of relay CC and another make contact of relay SW to the tip side of the called line. Relay YD is now operated over a circuit extending from (+), make contact of relay CC, make contact of relay PS and lower winding of relay YD to (−). Relay YD closes a circuit for operating relay PD which may be traced from (+), make contact of relay CC, make contact of relay YD and lower winding of relay PD to (−). Relay PD opens up the above described locking circuit for relay PS for effecting the release of this relay. The release of relay PS opens up the above described first locking circuit for relay CC but before this happens a second locking circuit is closed for relay CC by the operation of relay PD, this locking circuit being traced from (+) on conductor MG, off normal contact IYON, make contact of relay PD, make contact and winding of relay CC to (−). The release of relay PS opens up the above described circuit for relay YD, this relay releases and opens up and releases relay PD, this relay in turn opening up the above described second locking circuit for relay CC for effecting the release of this latter relay. The release of relay CC removes (+) from conductor MG, which is effective to release relays RT and SW, the latter relay disconnecting (+) from sleeve wiper S. With relays CC, PS, RT and RD released, the release magnet circuit is closed for restoring the connector switch to normal. It will be obvious that 110(+) is disconnected from the called line by the release of relays PD and PS.

In the event that the operator takes down the connection before the called party hangs up, then relays AB and AA are in their operated positions. This connects (+) to the HS conductor through the lower winding of relay TL at the connector and, since (+) is connected to the HS conductor through both windings of relay HS of the incoming trunk circuit, the HS lead is de-energized and neither relay TL nor relay HS will be operated. Relays CB and RD are released as before, with relay RD disconnecting (+) from conductor MG, but at this time relay PS is operated for maintaining (+) on conductor MG. The release of relay RD removes (+) from conductor CS for releasing the preceding circuits in the previously described manner and it also closes a circuit at this time for operating relay YD which may be traced from (+), break contact of relay RD, make contact of relay AA and lower winding of relay YD to (−). The circuits stay in this condition until the called party hangs up, at which time relays AB and AA are released. With relay YD operated and with relay AA operated, (+) is re-applied to conductor CS for holding this connector busy until the called party releases. This circuit may be traced from (+), make contact of relay YD and make contact of relay AA to conductor CS. Now when relay AA is released, this circuit is opened for rendering the connector circuit idle and again selectable.

Recalling that relay PS is locked operated at this time, it will be observed that (+) is applied through its lowermost make contact, by way of a make contact of relay SW, to conductor MG for holding the connector circuits in condition for coin control operation. Now when relay AA is released by the called party hanging up the receiver, the above described circuit to relay YD is opened and, since relay CC is not yet operated, the YD relay is released. A circuit is now closed for operating relay CC which may be traced from (+), break contact of relay RD, break contact of relay AA, break contact of relay YD, make contact of relay PS and winding of relay CC to (−). Relay CC closes the previously described first locking circuit for itself and it applies 110(+) to the called line in the previously described manner. Relays YD and PD are again operated for opening up and releasing relay PS, with this relay opening up and releasing relays YD and PD in sequence, all as previously explained. Relay CC is locked operated by means of its second locking circuit when relay PD operates and when relay PD releases, this second locking circuit is opened for releasing relay CC. This disconnects (+) from conductor MG for releasing relays RT and SW, the switch being restored to normal in the previously described manner. The release of relays PD and PS disconnects 110(+) from the called line, thus restoring the circuits to normal.

*Manual coin control*

This is a case where the operator desires to collect or return the coin at the called paystation while the called party is still on the line. With the circuits in this condition, relays CB, RD, AB and AA of the connector, as well as various other relays, previously explained, are in their operated conditions. The operator applies 110(+) or 110(−) to the tip side of the cord and outgoing trunk circuit by means of the coin collect or coin return key. This coin potential is extended by way of conductor T, upper left hand winding of repeat coil RC of the outgoing trunk repeater, make contact of relay F, winding of relay D, resistor IR and break contact of relay L to (+). Relay D operates and closes an obvious circuit for operating relay H. It will be obvious that relays A, E and F of the outgoing trunk repeater are operated, relay R not being operated because relay SR of the incoming trunk repeater is operated with the called party on the line for maintaining the inter-office trunk in a dry condition.

With relay H operated, (+) is applied to the inter-office tip trunk conductor TT by way of a break contact of relay K. At the first energization of the 60 I. P. M. common conductor, following the operation of relay H, relay J is operated over a circuit extending from this common conductor, make contact of relay H, break contact and upper winding of relay J to (—). Relay J locks itself operated over a circuit extending from (+), make contact of relay H, X make contact and both windings in series of relay J to (—), the operation of relay J disconnecting the common conductor from its upper winding. When the common interrupter is disconnected from the upper winding of relay J it is switched into connection with the winding of relay P by way of make contacts of relays H, J and F. Consequently relay P is intermittently operated by the pulses appearing on the common 60 I. P. M. conductor. The release of relay P connects the tip conductor T (to which the coin battery is connected) by way of a make contact of relay H, break contact of relay P, make contact of relay H and break contact of relay K to the inter-office conductor TR. Before relay P releases, (+) through resistor 9R is connected back to the coin battery, consequently relay P shifts the coin control circuit from (+) through resistor 9R to (+) through relays in the incoming trunk repeater over a circuit which has approximately the same value of resistance as resistor 9R, so that the lamp in the coin control circuit is not flashed. This coin potential applied to conductor TR extends through break contact of relay CT of the incoming trunk repeater, make contact of relay LS, upper left hand winding of repeat coil RC, break contact of relay CS1, resistor R3, make contact of relay LS, winding of relay CS, (the short circuit across the winding of relay CS being removed because relay SR is operated at this time), resistor R9 and break contact of relay RG to (+). Relay CS operates and closes a circuit for operating relay TM extending from (+), make contact of relay CS, make contact of relay RD and winding of relay TM to (—). Relay TM closes an operating circuit for relay CS1 which may be traced from (+), break contact of relay CT, make contact of relay CB, make contact of relay RD, break contact of relay HS, make contact of relay RD, make contact of relay CS, make contact of relay TM and upper winding of relay CS1 to (—). Relay CS1 opens up the above described operating circuit for relay CS for releasing this relay, relay CS1 now being held operated by means of the (+) applied to conductor TT by relay H of the outgoing trunk repeater (previously described), break contact of relay CT, make contact of relay LS, lower left hand winding of repeat coil RC, make contact and lower winding of relay CS1 to (—). Relay CS1 maintains a holding circuit for relay TM.

When relay TM operates, the HS conductor is switched from (+) to (—). This prevents the operation of relay HS of the incoming trunk repeater because both its windings are now energized in opposition, the circuit for its upper winding leading by way of the HS conductor to (+) at both windings of relay TL of the connector, the lower winding of this relay extending to (+) through make contacts of relays SW and AA. Relay TL of the connector is operated by this switch in the HS conductor, for closing an operating circuit for relay CS of the connector which may be traced from (+), make contact of relay TL, make contact of relay AA and winding of relay CS to (—). Relay CS of the connector places a holding circuit across the AB relay of the connector, this circuit being traced from (+), upper winding of relay CB, make contact of relay CS, resistor 20RS and upper winding of relay AB to (—). It will be observed that this holding circuit also holds relay CB operated for preventing the release of the connector circuits at this time. The incoming trunk conductors are now connected directly to the connector wipers, conductor CT being traced through make contact of relay AB, make contact of relay CS, make contact of relay RT, break contact of relay CC and make contact of relay SW to wiper R. Conductor CR may be traced through a make contact of relay AB, make contact of relay CS, make contact of relay RT, break contact of relay CC and make contact of relay SW to wiper T.

Referring back to the originating office, the coin control potential intermittently applied to inter-office trunk conductor TR, as previously pointed out, is connected to both rectifiers RF2 and RF3 of the incoming trunk repeater through a make contact of relay CS1. If 110(+) is connected at the cord circuit, current will flow through rectifier RF3 and winding of relay CC to (+) on conductor TT at the make contact of relay H of the outgoing trunk repeater, while if 110(—) is applied at the cord circuit, current will flow through rectifier RF2 and winding of relay CR to this (+) in the originating office. Consequently, relay CC will operate from coin collect battery for extending 110(+) at a make contact of relay CC, by way of a break contact of relay CR, lamp ML, winding of relay CA, make contact of relay CS1, make contacts in multiple of relay TM, make contacts of relay SW, break contacts of relay CT, conductors T and R, make contacts of relay SW of the selector, wipers ST and SR, conductors CT and CR and over the previously described clear circuits to the tip and ring conductors of the called line for operating the coin mechanism at the called station in the well known manner for collecting the coin. If relay CR is operated then 110(—) is extended over the same circuit for operating the coin mechanism at the called station for refunding the coin. Either coin collect or coin return current applied to the called line operates relay CA at each operation of the CC or CR relay and since the CC or CR relay will be intermittently operated by the intermittent operation of relay P in the outgoing trunk repeater, lamp ML will flash as an indication to the attendant in the terminating office that the incoming trunk repeater is effecting a coin control operation.

The operator in the distant toll office gets a steady lamp (lamp shown connected to coin control key of cord circuit, it being understood that the coin battery may come through a relay winding, with the relay having a make contact in a local lamp circuit) to indicate that coin potential is being applied to the called line and that the coin has not yet been disposed of at the coin box. This is because the intermittent operations of relay P in the outgoing trunk repeater do not materially change the value of the circuit of the lamp (or relay) in the coin supply at the cord circuit. With relay P operated, the coin supply circuit leads to (+) through resistor 9R, which may be 1000 ohms for example. With relay P released, the coin supply circuit is extended over the R trunk, break contact of relay CT, make contact of relay LS, upper left hand winding of repeat coil RC, make contact of relay CS1, make contact of relay CC or CR (immediately operated by the coin current), resistor R10, which may be 500 ohms for example, make contact of relay CA, make contact of relay CS1, lower left hand winding of repeat coil RC, make contact of relay LS, break contact of relay CT and trunk T to (+). If the resistance of the trunk conductors, plus the two repeat coil windings equals 500 ohms, then the total resistance in this circuit is 1000 ohms. Therefore, the intermittent operation of relay P maintains the lamp steadily illuminated. When the coin is disposed of, relay CA cannot operate when coin battery is next applied to the line, consequently the only path to (+) for the coin current at the cord circuit is through one of the relays CC or CR, which have high resistances, 8600 ohms each for example. Therefore the lamp (or relay) at the cord circuit is de-energized while relay P is released and energized while relay P is operated, thus resulting in a flashing lamp to indicate that the coin has been disposed of.

The operator now restores the key to normal, thus disconnecting coin control battery from the trunk circuit, restoring the circuits to their previously described condition, with the plug still in the jack and the called party still on the line. When disconnection takes place, the circuit operations are all as previously described.

Having described an inter-office toll switching system as particularly adaptable for use in automatic telephone systems as one specific embodiment of the present invention, it is desired to be understood that this form is selected to facilitate the disclosure of the invention rather than to limit the number of forms which it may assume and it is to be further understood that various modifications, adaptations and alterations may be applied to the specific form shown to meet the requirements of practice, without in any manner departing from the spirit or scope of the present invention except as limited by the appended claims.

What we claim is:

1. In a telephone system, an operator's position, a dial office, automatic switches and telephone lines in said office, a supervisory signal at said operator's position, a pair of trunk line conductors interconnecting said operator's position and said automatic switches, supervisory signal control means operative to intermittently establish a direct current flow over said trunk line conductors, means controlled from said operator's position over said trunk line conductors for setting said automatic switches to establish a talking and signaling circuit from said operator's position to any of said telephone lines, means controlled in response to the setting of one of said automatic switches on to the terminals of a busy one of said telephone lines for applying a busy tone to said trunk line conductors and for operating said supervisory signal control means, and means controlled by the intermittently established direct current flow over said trunk line conductors for flashing said supervisory signal.

2. In a telephone exchange system, an operator's position, automatic switches, telephone lines, a supervisory signal at said operator's position, a trunk line for interconnecting said operator's position and said automatic switches, supervisory signal control means operative to intermittently establish a direct current flow over said trunk line conductors, means controlled from said operator's position over said trunk line for setting one of said automatic switches into connection with terminals of any one of said telephone lines, means controlled in response to the setting of said switch on to terminals of an idle telephone line for establishing a steady direct current flow over said trunk line, means controlled in response to the setting of said switch on to the terminals of a busy telephone line for operating said supervisory signal control means to establish an intermittent direct current flow over said trunk line conductors, means controlled by the steady flow of direct current over said trunk line for steadily displaying said supervisory signal, and means controlled by the intermittently established direct current flow over said trunk line for flashing said supervisory signal.

3. In a telephone exchange system, an operator's position, automatic switches, telephone lines, a supervisory signal at said operator's position, a trunk line interconnecting said operator's position and said automatic switches, supervisory signal control means operative to intermittently establish a direct current flow over said trunk line, means controlled from said operator's position over said trunk line for setting one of said automatic switches into connection with terminals of any one of said telephone lines, means controlled in response to the setting of said switch on to the terminals of an idle telephone line for establishing a steady direct current flow over said trunk line, means controlled in response to the setting of said switch on to the terminals of a busy telephone line for operating said supervisory signal control means to establish an intermittent direct current flow over said trunk line, means controlled by a steady direct current flow over said trunk line for steadily displaying said supervisory signal, means controlled by the intermittently direct current flow over said trunk line for flashing said supervisory signal, and means controlled by the response of the called party when said switch is set on the terminals of an idle line for preventing the establishment of any direct current flow over said trunk line and thereby preventing the display of said supervisory signal.

4. In a telephone exchange system, an operator's position, automatic selector and connector switches, telephone lines, a signal at said operator's position, a trunk line inter-connecting said operator's position and said switches, means controlled from said operator's position over said trunk line for setting a selector switch into connection with terminals of a connector switch, means controlled from said operator's position over said trunk line for setting said connector switch into connection with terminals of any one of said telephone lines, means controlled in response to the setting of said connector switch on to the terminals of an idle telephone line for steadily energizing said trunk line, means controlled in response to the setting of said connector switch on to the terminals of a busy telephone line for intermittently energizing and de-energizing said trunk line at a first rate, means controlled by the steady energization of said trunk line for steadily displaying said signal, means controlled by the intermittent energization of said trunk line at said first rate for flashing said signal at said first rate, means controlled in response to said selector switch finding no path available to a connector switch for intermittently energizing and deenergizing said trunk line at a second rate, and means controlled by the intermittent energization of said trunk line at said second rate for flashing said signal at said second rate.

5. In a telephone exchange system, an operator's position, automatic selector and connector switches, telephone lines, a signal at said operator's position, a trunk line inter-connecting said operator's position and said switches, means controlled from said operator's position over said trunk line for setting a selector switch into connection with terminals of a connector switch, means controlled from said operator's position over said trunk line for setting said connector switch into connection with terminals of any one of said telephone lines, means controlled in response to the setting of said connector switch on to the terminals of an idle telephone line for steadily energizing said trunk line, means controlled in response to the setting of said connector switch on to the terminals of a busy telephone line for intermittently energizing and de-energizing said trunk line at a first rate, means controlled by the steady energization of said trunk line for steadily displaying said signal, means controlled by the intermittent energization of said trunk line at said first rate for flashing said signal at said first rate, means controlled in response to said selector switch finding no path available to a connector switch for intermittently energizing and de-energizing said trunk line at a second rate, means controlled by the intermittent energization of said trunk line at said second rate for flashing said signal at said second rate, means for transmitting a busy tone to said operator's position when said signal is flashed at said first rate, and means for preventing the transmission of a busy tone to said operator's position when said signal is flashed at said second rate.

6. In an automatic telephone system, an originating office and a terminating office inter-connected by a trunk circuit, a selector in said terminating office having access to a plurality of levels, a level marking wiper on said selector movable concurrently with the level selecting movement of said selector, a pair of trunk line conductors incoming to said selector, a group of outgoing trunk line conductors accessible to said selector for each of said levels, a plurality of terminals, each of said terminals being positioned to be engaged successively by said wiper as said selector is successively advanced to the selector levels, an incoming trunk repeater terminating said trunk circuit in said terminating office, means in said incoming trunk repeater inductively connecting said trunk circuit to the trunk line conductors incoming to said selector, receiving and repeating means in said trunk repeater controlled from said originating office for receiving and repeating impulses from said originating office to said selector whereby said selector selects any one of said levels, and means controlled by said level marking wiper and predetermined ones of said terminals for conductively connecting said trunk circuit to the trunk line conductors incoming to said selector when said selector is operated to select predetermined ones of said levels.

7. In a telephone exchange system, an operator's position, a dial office, automatic switches in said dial office, a line terminating in said dial office, a substation on said line, a toll switching trunk connecting said dial office with said toll office, means controlled from said operator's position over the conductors of said trunk for setting said automatic switches to establish a connection from said operator's position to said line, means including a source of current for energizing said trunk conductors when said connection has been established and before the station on said line has answered the call, means controlled from said operator's position for de-energizing said trunk conductors for releasing said connection before said station has answered the call, means responsive to the answering of the call at said station for de-energizing said trunk conductors, means at said operator's position for applying a pulse to one of said trunk conductors, and means controlled by the pulse applied to said one trunk conductor for releasing said connection while the called station is still on the line.

8. In a telephone exchange system, a battery having a first and a second terminal, an operator's position, a dial office, connector switches and telephone lines in said dial office, a signal at said operator's position, a trunk circuit inter-connecting said operator's position and said dial office, a trunk repeater terminating said trunk circuit in said dial office, a pair of line conductors and a signaling conductor extending from said trunk repeater to one of said connector switches, means controlled from said operator's position over said trunk circuit for setting said one connector switch on to terminals of one of said telephone lines, a first differential relay at said trunk repeater and a second differential relay at said connector each of said relays having first and second windings, a first conductor connected to the mid-point of the windings of said first relay and to said first battery terminal, a second conductor connected to the mid-point of the windings of said second relay and to said first battery terminal, a control conductor inter-connecting said second windings of said relays, said first winding of each of said relays being connected to said first battery terminal, means controlled in response to the setting of said connector switch on to the terminals of said telephone line when idle for switching said second conductor from said first battery terminal to said second battery terminal thereby energizing said second windings of said relays over said control conductor and at the same time energizing the first winding of said second relay in opposing relation to said energization of said second winding of said second relay and at the same time shunting said first winding of said first relay, said second relay remaining in its normal position in response to said energizing circuits for its first and second windings and said first relay operating in response to said energizing circuit for its second winding, and means controlled by said operation of said first relay for displaying said signal.

9. In a telephone exchange system, a battery having a first and a second terminal, an operator's position, a dial office, connector switches and telephone lines in said dial office, a signal at said operator's position, a trunk circuit inter-connecting said operator's position and said dial office, a trunk repeater terminating said trunk circuit in said dial office, a pair of line conductors and a signaling conductor extending from said trunk repeater to one of said connector switches, means controlled from said operator's position over said trunk circuit for setting said one connector switch on to terminals of one of said telephone lines, a first differential relay at said trunk repeater and a second differential relay at said connector each of said relays having first and second windings, a first conductor connected to the mid-point of the windings of said first relay and to said first battery terminal, a second conductor connected to the mid-point of the windings of said second relay and to said first battery terminal, a control conductor inter-connecting said second windings of said relays, said first winding of each of said relays being connected to said first battery terminal, means controlled in response to the setting of said connector switch on to the terminals of said telephone line when busy for intermittently switching said second conductor from said first battery terminal to said second battery terminal thereby intermittently energizing said second windings of said relays over said control conductor and at the same time intermittently energizing the first winding of said second relay in opposing relation to said energization of said second winding of said second relay and at the same time shunting said first winding of said first relay, said second relay remaining in its normal position in response to said energizing circuits for its first and second windings and said first relay intermittently operating in response to said energizing circuit for its second winding, and means controlled by said intermittent operation of said first relay for flashing said signal.

10. In a telephone exchange system, a battery having a first and a second terminal, an operator's position, a dial office, connector switches and telephone lines in said dial office, a signal at said operator's position, a trunk circuit interconnecting said operator's position and said dial office, a trunk repeater terminating said trunk circuit in said dial office, a pair of line conductors and a signaling conductor extending from said trunk repeater to one of said connector switches, means controlled from said operator's position over said trunk circuit for setting said one connector switch on to terminals of one of said telephone lines, a first differential relay at said trunk repeater and a second differential relay at said connector each of said relays having first and second windings, a first conductor connected to the mid-point of the windings of said first relay and to said first battery terminal, a second conductor connected to the mid-point of the windings of said second relay and to said first battery terminal, a control conductor inter-connecting said second windings of said relays, said first winding of each of said relays being connected to said first battery terminal, means controlled in response to the setting of said connector switch on to the terminals of said telephone line when idle for switching said second conductor from said first battery terminal to said second battery terminal thereby energizing said second windings of said relays over said control conductor and at the same time energizing the first winding of said second relay in opposing relation to said energization of said second winding of said second relay and at the same time shunting said first winding of said first relay, said second relay remaining in its normal position in response to said energizing circuits for its first and second windings and said first relay operating in response to said energizing circuit for its second winding, means controlled by said operation of said first relay for displaying said signal, means controlled by the response of the called party on said telephone line for switching said second conductor from said second battery terminal to said first battery terminal thereby deenergizing both windings of said relays and said control conductor, said second relay remaining in its normal position and said first relay releasing to its normal position, and means controlled by said release of said first relay for effacing said displayed signal.

11. In a telephone exchange system, a battery having a first and a second terminal, an operator's position, a dial office, connector switches and telephone lines in said dial office, a signal at said operator's position, a trunk circuit interconnecting said operator's position and said dial office, a trunk repeater terminating said trunk circuit in said dial office, a pair of line conductors and a signaling conductor extending from said trunk repeater to one of said connector switches, means controlled from said operator's position over said trunk circuit for setting said one connector switch on to terminals of one of said telephone lines, a first differential relay at said trunk repeater and a second differential relay at said connector each of said relays having first and second windings, a first conductor connected to the mid-point of the windings of said first relay and to said first battery terminal, a second conductor connected to the mid-point of the windings of said second relay and to said first battery terminal, a control conductor inter-connecting said second windings of said relays, said first winding of each of said relays being connected to said first battery terminal, means controlled in response to the setting of said connector switch on to the terminals of said telephone line when idle for switching said second conductor from said first battery terminal to said second battery terminal thereby energizing said second windings of said relays over said control conductor and at the same time energizing the first winding of said second relay in opposing relation to said energization of said second winding of said second relay and at the same time shunting said first winding of said first relay, said second relay remaining in its normal position in response to said energizing circuits for its first and second windings and said first relay operating in response to said energizing circuit for its second winding, means controlled by said operation of said first relay for displaying said signal, means controlled by the response of the called party on said telephone line for switching said second conductor from said second battery terminal to said first battery terminal thereby deenergizing both windings of said relays and said control conductor, said second relay remaining in its normal position and said first relay releasing to its normal position, and means controlled by said release of said first relay for effacing said displayed signal and for clearing said trunk circuit of all connections to said battery.

12. In a telephone exchange system, a battery having a first and a second terminal, an operator's position, a dial office, connector switches and telephone lines in said dial office, a signal at said operator's position, a trunk circuit interconnecting said operator's position and said dial office, a trunk repeater terminating said trunk circuit in said dial office, a pair of line conductors and a signaling conductor extending from said trunk repeater to one of said connector switches, means controlled from said operator's position over said trunk circuit for setting said one connector switch on to terminals of one of said telephone lines, a first differential relay at said trunk repeater and a second differential relay at said connector each of said relays having first and second windings, a first conductor connected to the mid-point of the windings of said first relay and to said first battery terminal, a second conductor connected to the mid-point of the windings of said second relay and to said first battery terminal, a control conductor interconnecting said second windings of said relays, said first winding of each of said relays being connected to said first battery terminal, means controlled in response to the setting of said connector switch on to the terminals of said telephone line when idle for switching said second conductor from said first battery terminal to said second battery terminal thereby energizing said second windings of said relays over said control conductor and at the same time energizing the first winding of said second relay in opposing relation to said energization of said second winding of said second relay and at the same time shunting said first winding of said first relay, said second relay remaining in its normal position in response to said energizing circuits for its first and second windings and said first relay operating in response to said energizing circuit for its second winding, means controlled by said operation of said first relay for displaying said signal, ringing control means at said operator's position, means responsive to the operation of said ringing control means for switching said first conductor from said first battery terminal to said second battery terminal thereby changing said energization of both windings of said second relay from opposing relation to aiding relation for operating said second relay, and means responsive to said operation of said second relay for ringing the station on said idle telephone line.

References Cited in the file of this patent

UNITED STATES PATENTS

| Number | Name | Date |
|---|---|---|
| 2,203,725 | Geitgey | June 11, 1940 |
| 2,360,291 | Wadsworth | Oct. 10, 1944 |